(12) United States Patent
Funyu

(10) Patent No.: US 6,320,587 B1
(45) Date of Patent: Nov. 20, 2001

(54) FONT PROCESSING APPARATUS IN NETWORK ENVIRONMENT AND METHOD THEREOF

(75) Inventor: Takashi Funyu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/815,438

(22) Filed: Mar. 11, 1997

(30) Foreign Application Priority Data

Aug. 26, 1996 (JP) .................................................... 8-223595

(51) Int. Cl.7 .................................................... G06F 15/00

(52) U.S. Cl. ............................................................ 345/467

(58) Field of Search .................................. 345/467, 468, 345/469, 470, 471, 472, 144, 141, 142

(56) References Cited

U.S. PATENT DOCUMENTS 5,802,538 * 9/1998 Ooishi .................................. 345/467

FOREIGN PATENT DOCUMENTS

| 0 511 438 | 11/1992 | (EP) . |
| 2 022 378 | 12/1979 | (GB) . |
| 2 051 527 | 1/1981 | (GB) . |

* cited by examiner

Primary Examiner—Phu K. Nguyen
(74) Attorney, Agent, or Firm—Staas & Halsey LLP

(57) ABSTRACT

When character media data is output to a client unit, a server unit dynamically extracts font data corresponding to the character media data from font resources of various styles of type that have been prepared in advance and creates required font resources. The font resources are sent to the client unit through the network and are used to display the character media data.

22 Claims, 21 Drawing Sheets

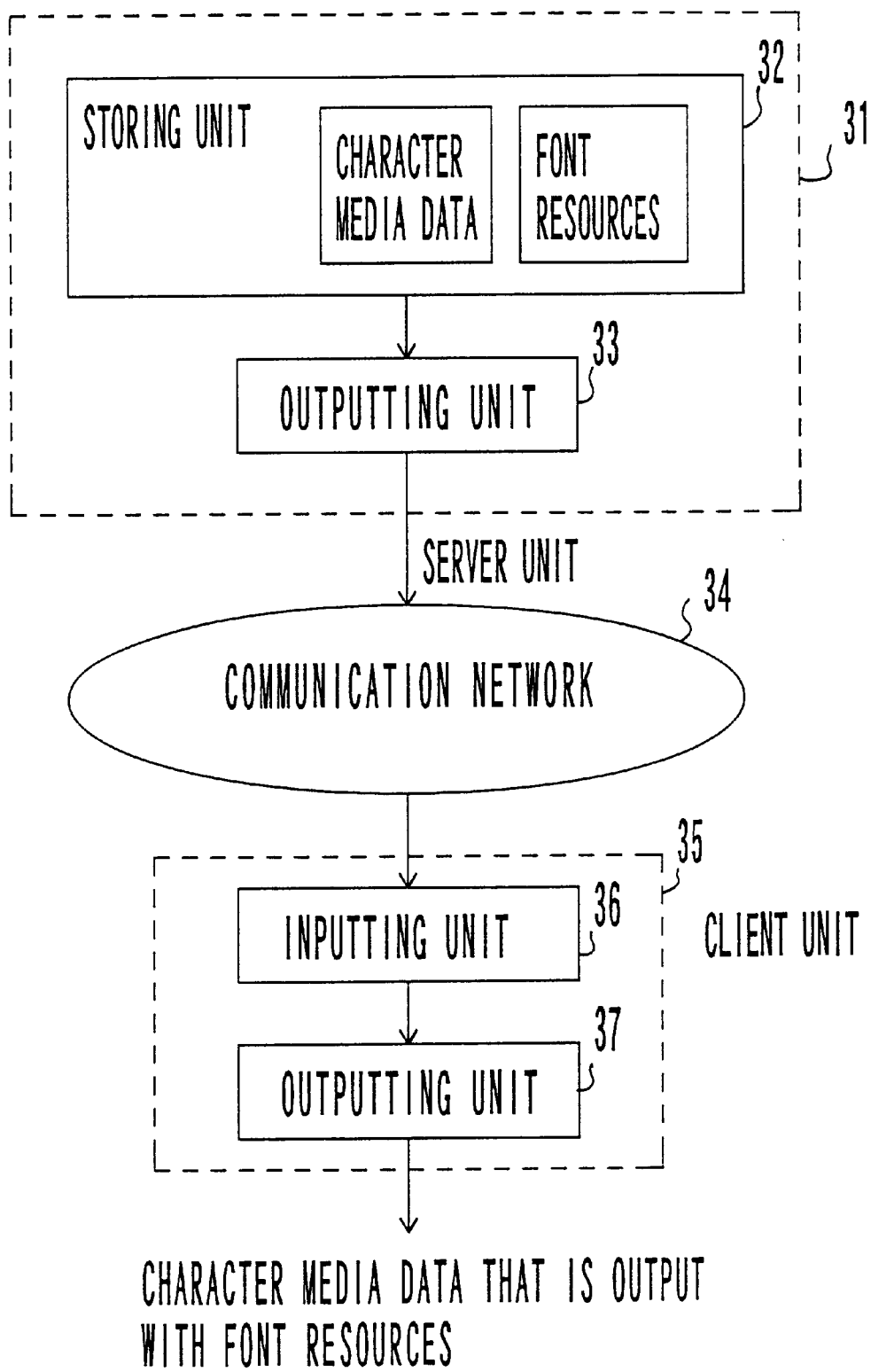
F I G. 2 A

```
-------- HOME PAGE OF VARIOUS SERVICES (HTML DOCUMENT) ----------
   <HTML>
   <HEAD>
   <TITLE>  HOME PAGE (SAMPLE) </TITLE>
   </HEAD>
   <BODY>
      THIS COMPANY WILL PROVIDE THE FOLLOWING SERVICES. <BR>
                              .
                              .
                              .
      L1~  <APPLET CODE='FontGet.class'> ············→ DESIGNATE CHARACTER RESOURCES
                                                        EXTRACTING APPLET.
      L2~  <PARAM NAME=text value='http://www.fujitsu.co.jp/Service.html'>  ···→ URL OF
                                                                              HTML DOCUMENT
           </APPLET>

<H1> OUTLINE OF SERVICE</H1>
                              .
                              .
                              .
L3~ <APPLET CODEBASE='http://www.fujitsu.co.jp/'            ·········→LOCATION OF APPLET
L4~         CODE='TextDraw.class' WIDTH=200 HEIGHT=50>      ·········→DESIGNATE DOCUMENT
                                                                      MEDIA PROCESSING APPLET
L5~ <PARAM NAME='text' value='CHARACTER STRING'>            ·········→DESIGNATE
                                                                      CHARACTER MEDIA
    </APPLET>

L6~ <APPLET CODE='ImageDraw. class'>                        ·········→DESIGNATE IMAGE
                                                                      MEDIA PROCESSING APPLET
L7~ <PARAM NAME='image' IMG='Image.gif'>                    ·········→DESIGNATE IMAGE
                                                                      MEDIA
    </APPLET>

L8~ <APPLET CODE='VoiceDraw. class'>                        ·········→DESIGNATE SOUND
                                                                      MEDIA PROCESSING APPLET
L9~ <PARAM NAME='midi' MIDI='Voice.aiff'>                   ·········→DESIGNATE SOUND
                                                                      MEDIA
    </APPLET>
                              .
                              .
                              .
   </BODY>
   </HTML>
```

F I G. 4

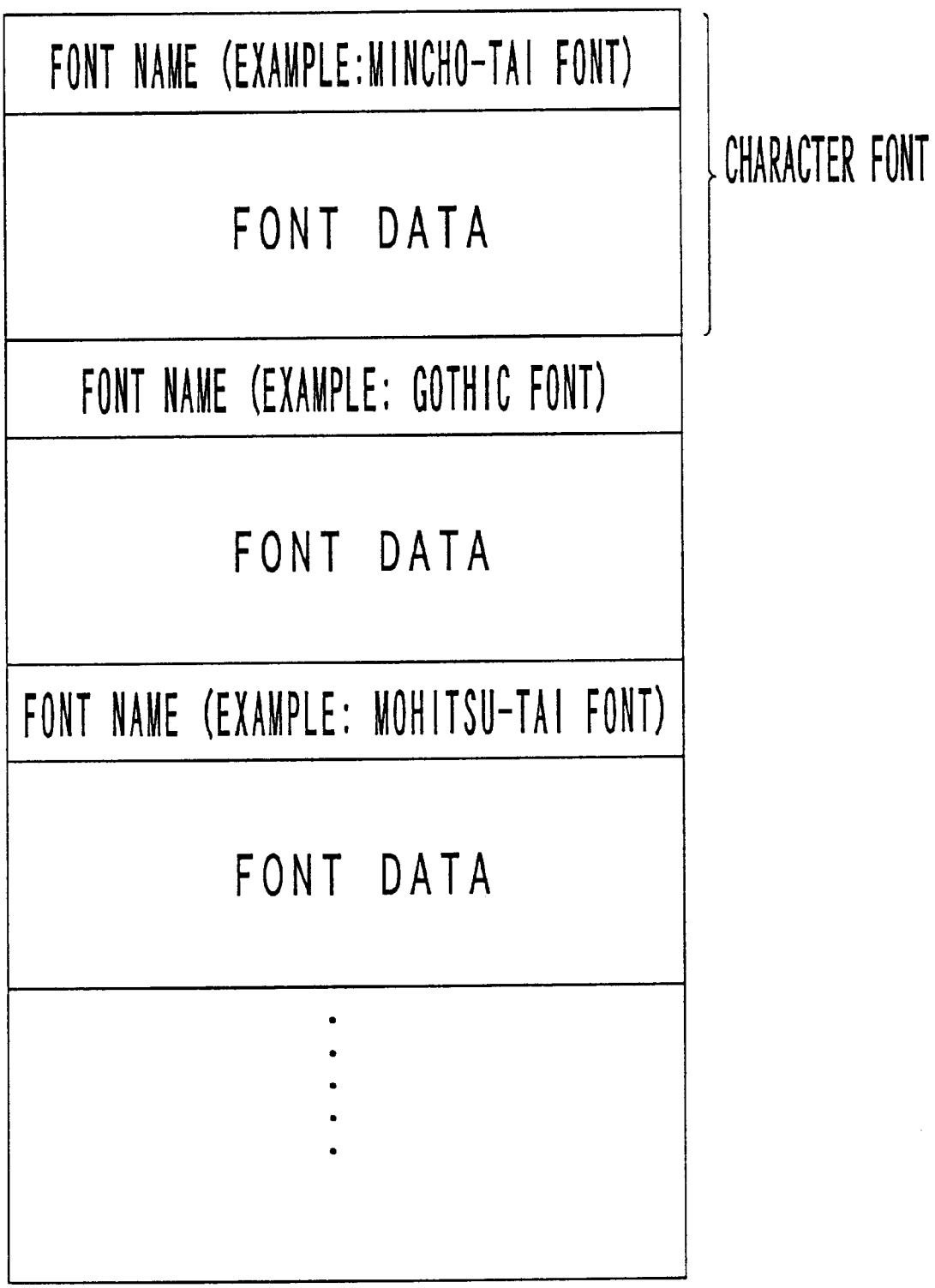
F I G. 5

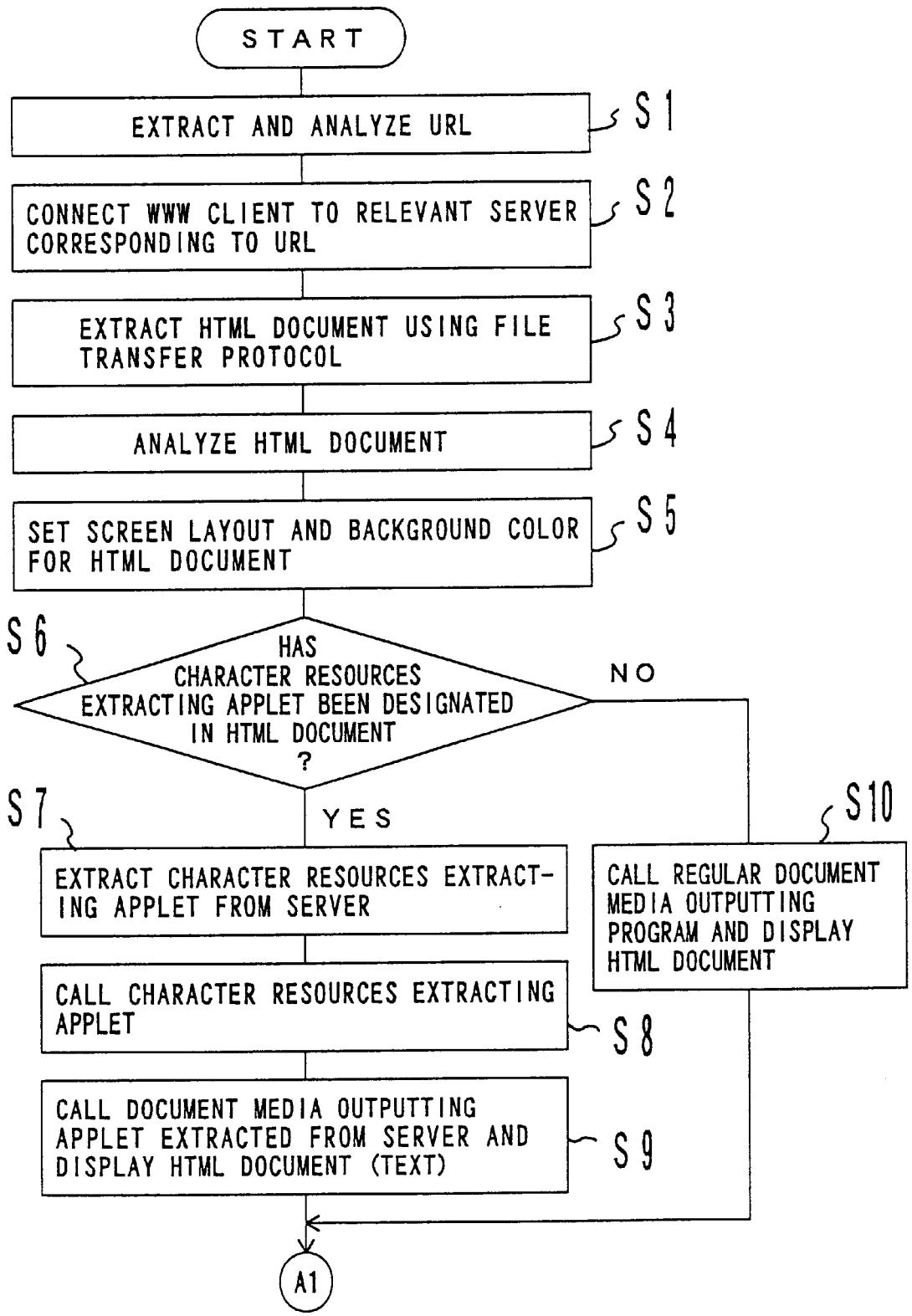
F I G. 7

FONT PROCESSING APPARATUS IN NETWORK ENVIRONMENT AND METHOD THEREOF

BACKGROUND OF THE INVENTION

1. Field of the Invention

The present invention relates to a font processing apparatus for outputting characters with proper fonts through a communication network in a network environment, where a plurality of information processing units are connected to the network, and a method thereof.

2. Description of the Related Art

In recent years, Internet services using WWW (World Wide Webs) have rapidly become more common. Companies, end users, and so forth have participated a wide variety of services such as information publications, commodity presentations, and commodity sales in a worldwide network environment. The WWWs represent Internet resources of information that server computers connected to the Internet provide. In the WWWs, a software tool termed a web browser is installed on a client computer that requests services to servers. The web browser communicates with the servers.

It is said that around 80% of companies, in the United States, have constructed local systems using the Internet services (namely, internal webs). An internal web is a kind of system that prohibits unauthorized users using a firewall or the like. Such a network is also referred to as an Intranet.

A large number of companies have entered the Internet businesses. Such companies establish their home pages on the Internet so as to provide a variety of services such as product presentations, sales, and maintenance services.

In addition, many companies are developing encrypting technologies for electronic commerce (EC). It is supposed that when such technologies are established, the number of business transactions using the Internet will be increased.

Further, the development methods of the application programs that run on the Internet have changed. Many innovations in development methods and providing methods thereof have resulted from the advent of new development languages such as Java.

Java is an interpreter, a network-based programming language. A program written in Java can be executed under any operating system (OS). A program written in Java is provided in the following manner.

The server side has programs that run on the client side as applets. An applet is a client program that is coded in Java. The applet is provided from a network server (downloaded therefrom) and executed on the client side. This program is downloaded to the memory of the computer of the client. However, the applet is overwritten with another program after it is executed. Thus, applets are referred to as disposable software.

A Java-oriented browser on the client side downloads a required object (data or contents) and an applet for processing the object and executes the applet. A Java-oriented browser is a browser that can download an applet developed in Java and execute it. An example of Java-oriented browser is called Hot Java.

A major feature of this method is in that network servers prepare information (data) of inventory, price, and so forth necessary for transactions, and programs necessary for sales contracts, and they can control operations of the programs from the server side. It is considered that such a new providing method is an ideal environment for transactions (business) with end users connected to the Internet.

Thus, the end users can connect their terminals to any sales services on the Internet without the need to construct special environments. In other words, when an end user connects his or her terminal to a particular service, he or she does not need to purchase a new software tool and install it on his/her terminal or add a new unit thereto.

Such a providing method is going to affect computer hardware. The terminal of each end user only requires a browser that accesses the network and a minimum OS that operates the browser. Other programs that each end user wants can be downloaded from the servers on the network. Thus, the memory, programs stored on the hard disc, and peripheral units necessary for the terminal can be minimized. As examples of such a terminal, so-called $500 terminals and portable terminals called PDAs (Personal Digital Assistants) are known.

Such a network environment can be treated as a system environment, where the whole network can be regarded as one OS and software tools that run on client terminals are provided by servers on the network.

So far, various Japanese language processing software products that run on main frame computers, UNIX systems, personal computers, and so forth have been developed. They include software tools that perform font related processes and user defined character (external character) processes. In these systems, each system has an independent environment called an OS. A Japanese language processing software tool is installed in the OS.

FIG. 1A is a schematic diagram showing a conventional Japanese language processing system accomplished on a personal computer. In the system shown in FIG. 1A, various software products 1 are conventional software products that output media data such as characters, images, charts, and so forth. The various software products 1, for example, include business application programs that are used by companies for selling products.

Character information included in the various media that are output are, for example, font names, codes of character strings, character sizes, and character pitches. When necessary, a media data file may be created for output.

A terminal accessing driver 3 is a program that causes a terminal display 5 of the personal computer to display various media data. The terminal accessing driver 3 includes a font driver 4. The font driver 4 obtains a relevant font from a font file and displays it on the terminal display 5.

There are regular fonts in the system, such as a Mincho-tai font 6, a Gothic font 7, and a Mohitsu-tai font 8. In addition, other fonts can be optionally added.

However, such a Japanese language process is performed closedly in a single system such as a personal computer. Thus, required fonts should be added by the end user.

FIG. 1B is a schematic diagram showing a flow of processes performed between a server that is an information provider and a client that is a user terminal, in the case that the client receives various information services on the current WWW. The processes are performed in the following manner.

(a) Using a URL (Uniform Resource Locator), the user designates the location of a desired information service (home page) on a web browser 17 displayed on a display unit 23 of a WWW client 16. A URL is identification information that represents resources on the network in a uniform mannner.

(b) The web browser 17 obtains an IP (Internet Protocol) address corresponding to the designated URL, connects the WWW client 16 to the relevant machine (WWW server) 11 on the network corresponding to the IP address, and downloads data of the "WWW server" home page to the WWW client 16.

The data of the home page has the format of an HTML document written in HTML (Hyper Text Markup Language). An HTML document is a kind of hyper text that contains links to other files. In this example, this data corresponds to document media 13.

In the WWW server 11, media to be provided 12 include documents, images, and sounds. The media 12 are categorized as three files that are the document media 13, image media 14, and sound media 15. The image media 14 and the sound media 15 are linked to the document media 13. In the HTML document, locations of various media data that are output along with a document have been defined by the links.

(c) The web browser 17 analyzes the document media 13 and obtains URLs of image media data and sound media data linked thereto.

(d) The web browser 17 obtains the IP address corresponding to the URLs of each media data, connects the WWW client 16 to the relevant machine on the network, and downloads the media data 14 and 15 to the WWW client 16.

(e) The web browser 17 displays and outputs the downloaded media data 14 and 15 to the display unit 23 along with the document media 13. Normally, outputting programs corresponding to individual media are provided. A document outputting program 20 causes a character string in the document media 13 to be displayed using a font that is extracted from a font file 18 by a font reading program 19. The font reading program 19 corresponds to the font driver 4 shown in FIG. 1A. An image outputting program 21 displays data of the image media 14. A sound outputting program 22 outputs data of the sound media 15.

The conventional information processing systems perform one of the following font related processes.

(1) A system determines font resources required to print character media and supplies to a printer fonts that the printer does not have.

(2) Font resources for outputting character media are downloaded from a host computer or a server to a client beforehand. The client outputs character strings using the fonts.

(3) When a client requires a particular font, it requests that font to a host computer or a server.

However, in the method (1), the system should check the fonts that the printer has. In the method (2), all required fonts are not always downloaded. In the method (3), the client terminal should have a dedicated software tool for requesting a font.

In the Internet environment such as a WWW, since the entire network is treated as one OS, the Japanese language process that includes the font related process and the user defined character handling process should be performed in a new method.

For example, when a company provides services through home pages, various kinds of fonts (styles of type) will be used to create sophisticated screen displays. However, it is difficult for the terminal of each end user to have all the required fonts. Thus, a system that supplies such fonts to each user terminal and allows them to be displayed on the display unit thereof is required.

In addition, any UNIX systems and personal computers that run on Japanese OSs can handle JIS (Japanese Industrial Standard) class 1 characters and JIS class 2 characters. When a user terminal handles addresses and names of customers in Japanese, since the JIS class 1 characters and JIS class 2 characters are not sufficient to express them, a system that can handle user defined characters as external characters should be used.

However, the external characters are defined by individual users. Thus, the external characters vary user by user. Consequently, external characters that one particular server has may not be displayed on other user terminals. On the Internet, a system that allows character strings including external characters to be displayed on each user terminal is desired.

SUMMARY OF THE INVENTION

An object of the present invention is to provide a font processing apparatus that allows various character expressions that a service provider wants to provide to be displayed on a user terminal regardless of font resources thereof in a network environment and a method thereof.

A font processing system according to the present invention is used in a network environment, where a server unit that provides information and a client unit that receives the information are connected with a communication network. The font processing system includes a font processing unit in the server unit and a font processing unit in the client unit.

The font processing unit in the server unit has a storing unit and an outputting unit. The storing unit stores font resources and character media data. The font resources are required to output the character media data. The font resources are dynamically created correspondingly to the character media data. The outputting unit sends the character media data and the required font resources to the network.

The font processing unit in the client unit has an inputting unit and an outputting unit. The inputting unit receives the character media data and the required font resources from the network. The outputting unit outputs the character media data using the required font resources.

When the character media data is output to the client unit, the server unit dynamically extracts font data corresponding to the character media data from font resources of various styles of type that have been prepared beforehand, and creates the required font resources. The font resources are sent to the client unit through the network and output from the outputting unit of the client unit.

According to such a font processing system, font data used for the outputting process is provided through the network along with character media data to be output to the display unit of the client unit. Thus, the operating environment relating to the character display of each user terminal in the network environment is dynamically prepared and supplied by the server unit.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2A is a schematic diagram showing the principle of a font processing system according to the present invention;

FIG. 4 is a program list showing applets designations in an HTML document;

FIG. 5 is a schematic diagram showing the format of an extracted font file;

FIG. 7 is the first part of a flow chart showing a first browser process;

DESCRIPTION OF THE PREFERRED EMBODIMENTS

Figure 1A:
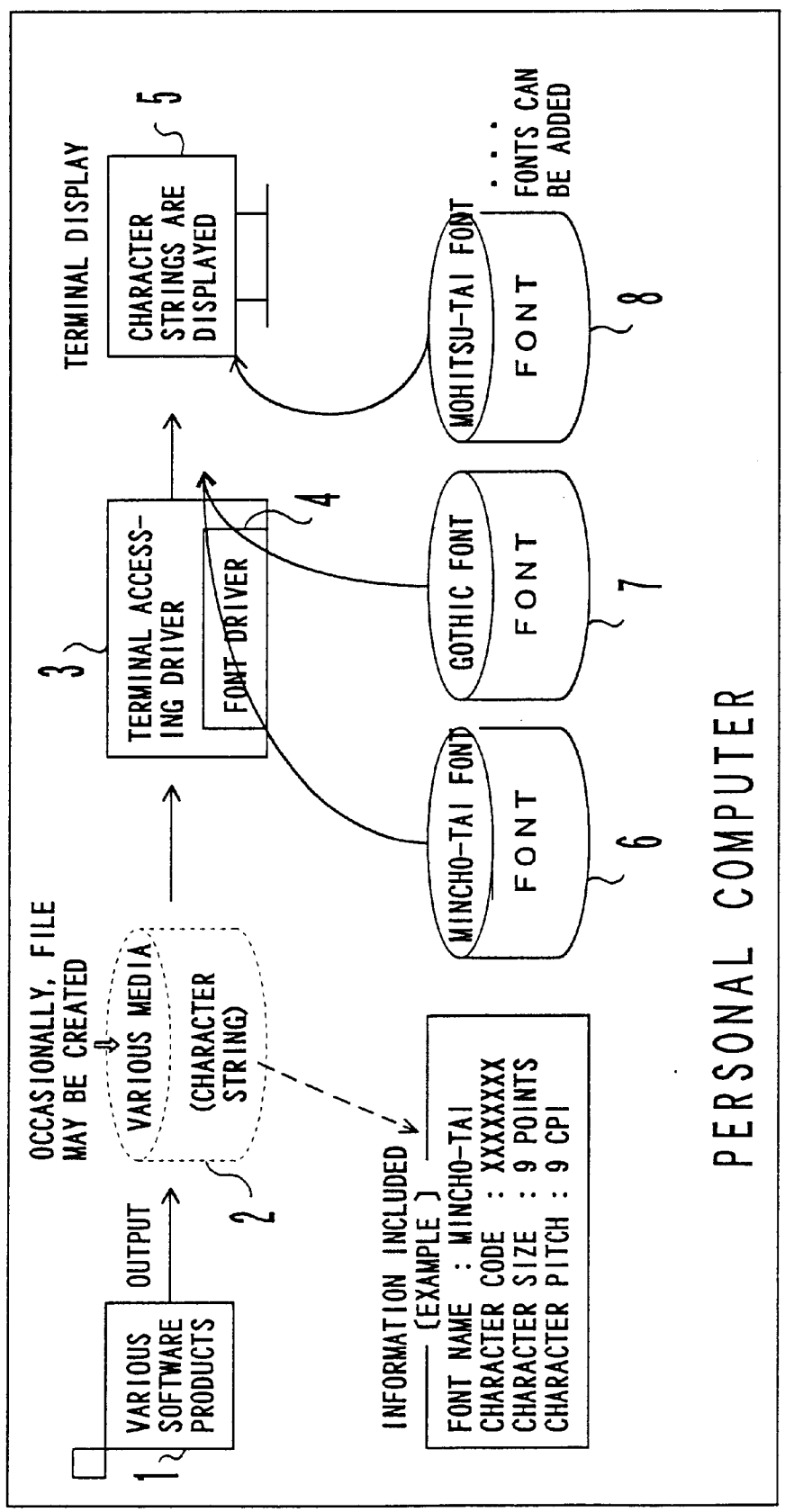
FIG. 1A is a schematic diagram showing a conventional Japanese language processing system.

Next, with reference to the accompanying drawings, embodiments of the present invention will be described in detail.

FIG. 2A is a schematic diagram showing the principle of a font processing system according to the present invention. The font processing system shown in FIG. 2A is used in a network environment, where a server unit 31 that provides information and a client unit 35 that receives the information therefrom are connected with a communication network 34. The server unit 31 has a font processing unit. Likewise, the client unit 35 has a font processing unit.

The server unit 31 is, for example, an information processing unit of a service provider that provides information such as services on the Internet. The client unit 35 is, for example, an end user terminal unit that receives services on the Internet.

The font processing unit in the server unit 31 has a storing unit 32 and an outputting unit 33.

The storing unit 32 stores font resources and character media data. The font resources are required to output the character media data. The font resources are dynamically created correspondingly to the character media data.

The outputting unit 33 sends the character media data and the required font resources to the network 34.

The font processing unit in the client unit 35 has an inputting unit 36 and an outputting unit 37.

The inputting unit 36 receives the character media data and the required font resources from the network 34.

The outputting unit 37 outputs the character media data on a display unit or the like using the required font resources.

When the server unit 31 outputs the character media data to the client unit 35, the server unit 31 dynamically extracts font data corresponding to the character media data from font resources of various styles of type and creates the required font resources. The created font resources are sent to the client unit 35 through the network 34 and then output from the outputting unit 37.

According to the font processing system, along with character media data to be output to the display unit of the client unit 35 or the like, font data used for the outputting process thereof is provided through the network 34. Thus, the operating environment of a character display on each end user terminal is dynamically prepared and supplied on the server side in the network environment.

When necessary, font data for outputting characters is supplied from the server side. Thus, since the user terminal does not need to prepare such font data, the structure and function of the user terminal can be simplified. In addition, since the service provider designates fonts for character media, it can create output screens in a combination of the fonts. Thus, the service provider can provide information with various character expressions.

For example, the storing unit 32 shown in FIG. 2A corresponds to a memory 72 or an external storing unit 75 shown in FIG. 3, which is explained later. The outputting unit 33 and the inputting unit 36 correspond to a network connecting unit 77 shown in FIG. 3. The outputting unit 37 corresponds to an outputting unit 74 shown in FIG. 3 or the media outputting program 64, 65, 66 and the display unit 67 shown in FIG. 2B, which is also explained later.

When each company provides services such as product presentations and product sales using the Internet, on such as a WWW, a server unit of the company provides each requesting end user terminal with information such as characters, still pictures, moving pictures and sounds that are displayed and output to the end user terminal. When character media are displayed, the provider wants to use various fonts to improve the expressions of data regardless of the environment of each end user terminal.

To satisfy such a demand, in addition to the above-described media data, the server unit supplies font resources required to output the media and a program part that performs the outputting process thereof in the present invention.

Figure 1B:
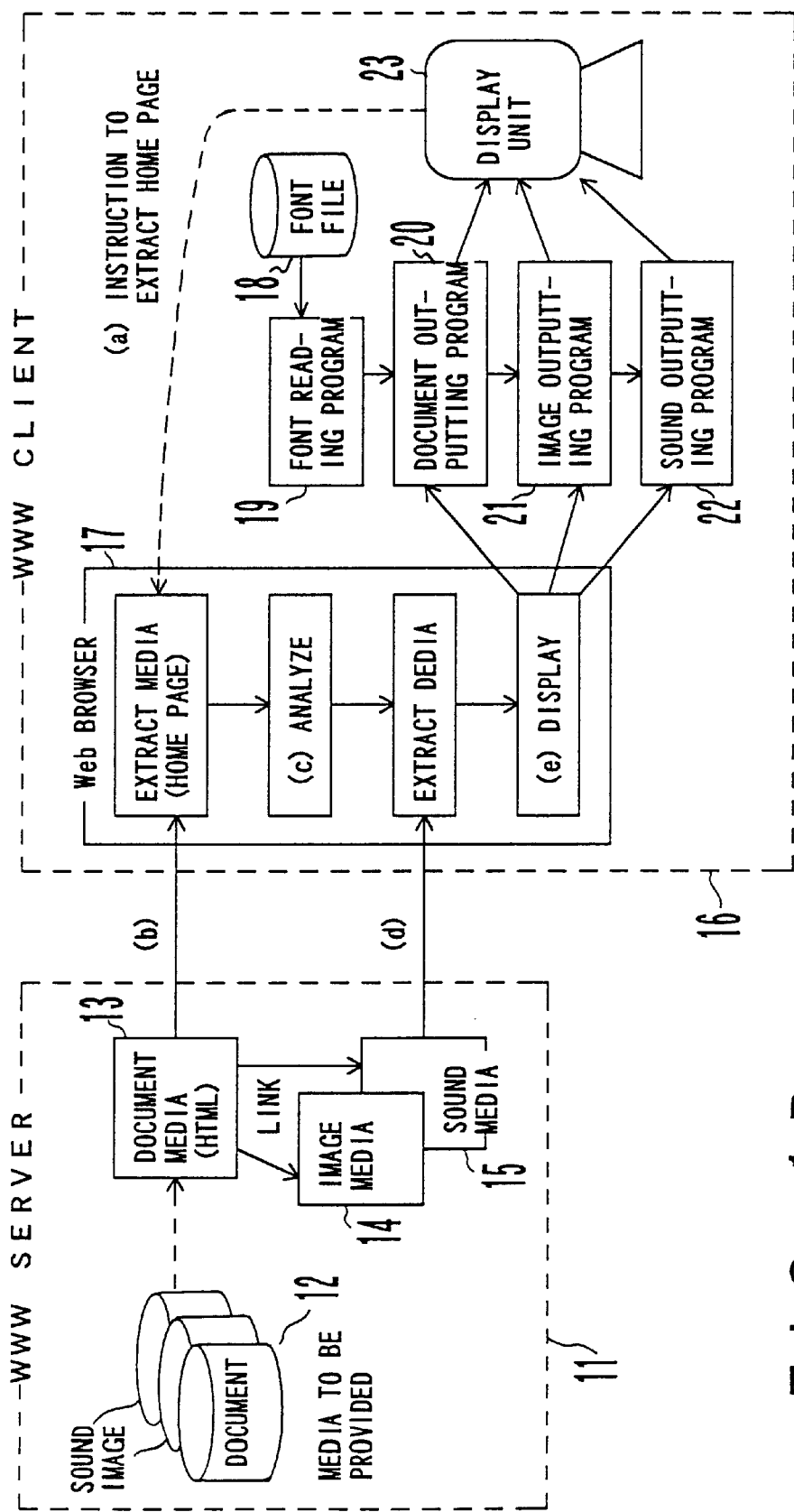
FIG. 1B is a schematic diagram showing a structure of the Internet.

In the conventional processing method shown in FIG. 1B, each end user should prepare fonts and output programs beforehand at the terminal side. On the other hand, according to the present invention, with the object-oriented concept, along with the media, fonts and output programs are supplied. The feature of the present invention is in that the operating environments of individual end user terminals connected to network environments are prepared and provided by the server.

Figure 2B:
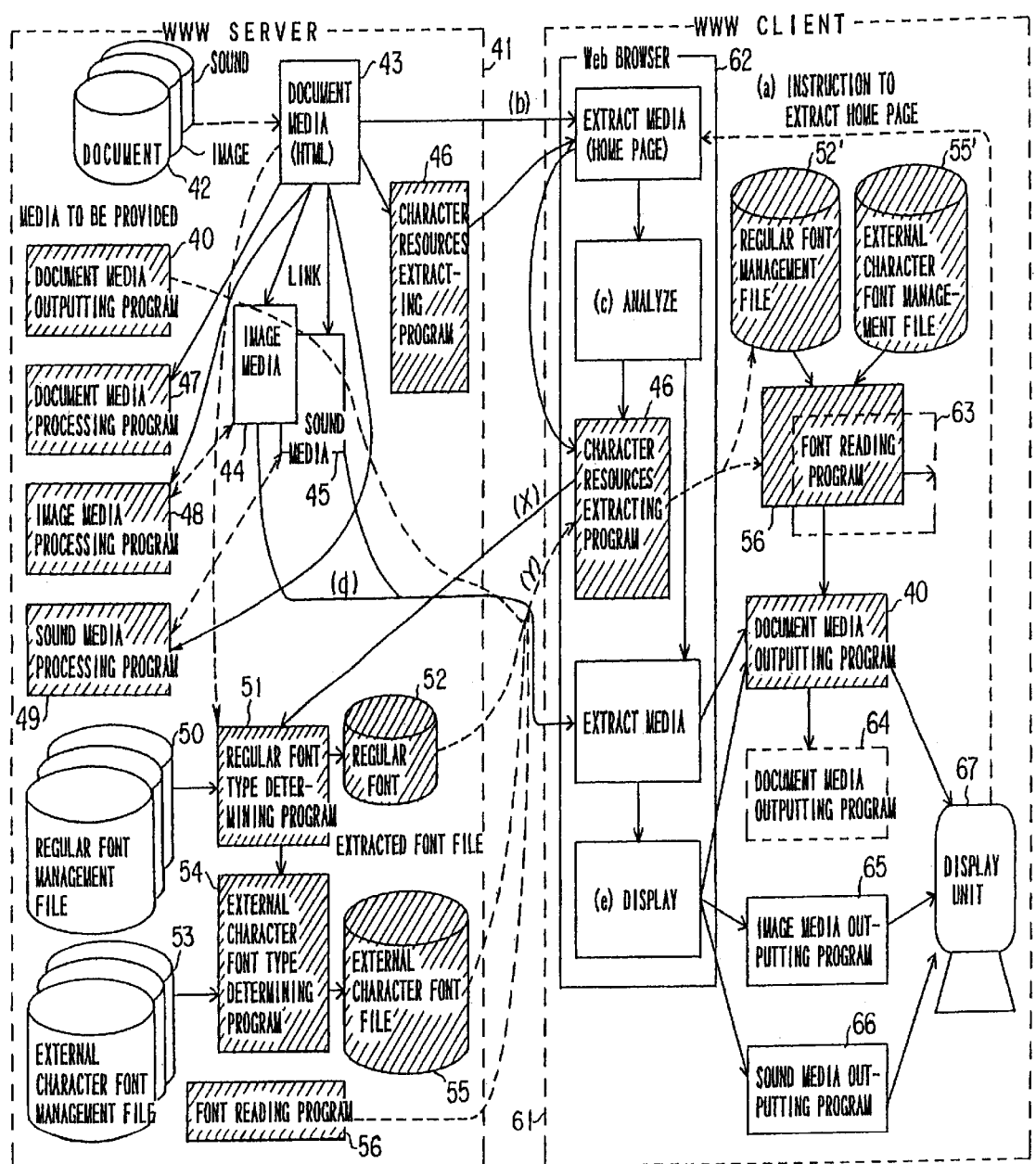
FIG. 2B is a schematic diagram showing a font processing system in the Internet environment.

FIG. 2B is a schematic diagram showing a font processing system that accomplishes a font related process on the Internet. The font processing system shown in FIG. 2B comprises a WWW server 41 and a WWW client 61. The WWW server 41 provides information. The WWW client 61 is connected to the WWW server 41 by a communication network.

The WWW server 41 has document media 43, image media 44, and sound media 45 that are files that store media to be provided 42. In addition, the WWW server 41 has a character resources extracting program 46, a document media outputting program 40, a document media processing program 47, an image media processing program 48, a sound media processing program 49, a regular font type determining program 51, an external character font type determining program 54, and a font reading program 56.

As with the document media 13 shown in FIG. 1B, the document media 43 is written in HTML. The document media 43 includes character media such as character strings and has links to the image media 44 and the sound media 45. The regular font type determining program 51 and the external character font type determining program 54 are programs written in, for example, C language and executed on the WWW server 41.

Further, the character resources extracting program 46, the document media outputting program 40, the document media processing program 47, the image media processing program 48, the sound media processing program 49, and the font reading program 56 are applet programs written in, for example, the Java language. These programs are downloaded to the WWW client 61 and then executed.

The character resource extracting program 46, the document media outputting program 40, and the font reading program 56 are common programs prepared beforehand in the system. On the other hand, the document media processing program 47, the image media processing program 48, and the sound media processing program 49 are programs that the service provider can individually designate.

The WWW client 61 has a display unit 67. In addition, the WWW client 61 has a web browser 62, a regular font reading program 63, a regular document media outputting program 64, a regular image media outputting program 65, and a regular sound media outputting program 66.

The web browser 62 is a Java-oriented browser that downloads applets from the WWW server 41 and executes them. The programs 63, 64, 65, and 66 are output processing programs in the WWW client 61 and correspond to, respectively, the font reading program 19, the document outputting program 20, the image outputting program 21, and the sound outputting program 22 shown in FIG. 1B.

The font processing system shown in FIG. 2B operates as follows.

(a) The user designates the location of a desired home page with the web browser 62 on the display unit 67 using a URL or the like.

(b) The web browser 62 obtains an IP address corresponding to the designated URL, connects the WWW client 61 to the WWW server 41 that is the relevant server corresponding to the IP address on the network, and downloads to the WWW client 61 the document media 43 corresponding to the home page and the character resources extracting program 46 to which the document media 43 is linked.

(c) The web browser 62 analyzes the document media 43, obtains URLs of image media data, sound media data, and so forth linked thereto, and calls the character resources extracting program 46. The character resources extracting program 46 downloads font resources required to output and display an HTML document, the document media outputting program 40, and the font reading program 56 from the WWW server 41 to the WWW client 61. The processing of the character resources extracting program 46 is composed of the following two steps (X) and (Y).

(X) The character resources extracting program 46 calls the regular font type determining program 51 in the WWW server 41 using a protocol such as Java so as to extract required regular fonts from the regular font management file 50. At this point, fonts corresponding to characters used in the document media 43 are extracted and stored in an extracted font file 52 of regular fonts.

The regular font type determining program 51 calls the external character font type determining program 54 so as to extract required external character fonts from an external character font management file 53.

At this point, fonts corresponding to external characters used in the document media 43 are extracted and stored in an extracted font file 55 of external character fonts.

(Y) The character resource extracting program 46 downloads the extracted font files 52, 55, the document media outputting program 40, and the font reading program 56 from the WWW server 41 to the WWW client 61. The files 52 and 55 are stored as a regular font management file 52' and an external character font management file 55' in the WWW client 61.

(d) The web browser 62 obtains the IP addresses corresponding to the URLs of individual media data obtained in (c), connects the WWW client 61 to the relevant servers on the network, and downloads the image media 44 and the sound media 45 therefrom.

(e) The web browser 62 outputs and displays the downloaded media data 44 and 45 to the display unit 67 along with the document media 43. Outputting programs corresponding to the individual media are provided.

When the document media 43 is output, the downloaded font reading program 56 and document media outputting program 40 are used instead of the regular font reading program 63 and the regular document media outputting program 64.

The document media outputting program 40 is a program for displaying character strings in the document media 43. The document media outputting program 40 causes the font reading program 56 to extract fonts. The font reading program 56 extracts relevant fonts for individual characters from the regular font management file 52' and the external character font management file 55' and supplies the extracted fonts to the document media outputting program 40.

The regular image media outputting program 65 displays data of the image media 44. The regular sound media outputting program 66 outputs data of the sound media 45.

As with the image media 44 and the sound media 45, other document media (not shown) can be linked to the document media 43 in the WWW server 41. In (d), the document media processing program 47, the image media processing program 48, and the sound media processing program 49 can be downloaded from the WWW server 41.

In this case, in (e), the document media processing program 47 displays data of document media linked to the document media 43. The image media processing program 48 displays data of the image media 44. The sound media processing program 49 outputs data of sound media 45.

Thus, the service provider can designate the editing process and/or outputting process of the other document media, the image media 44, and the sound media 45, and cause the WWW client 61 to perform the processes.

According to the font processing method, the server (host computer) dynamically determines fonts needed by a client terminal that does not have the regular character media outputting program 64 and that needs to output character media, and dynamically downloads the determined fonts along with character media (output document) to the client (end user terminal). Thus, even if a terminal is simplified and does not have regular fonts, it can display various types of characters.

In addition, the server provides program portions (applets) that output and/or display fonts. The applets are downloaded to the client along with the character media. When the client has completed the outputting process, the media data, font resources, and program portions that have been downloaded from the server are deleted from the client. Thus, the operating environment of each end user terminal on the network is provided and controlled by the server.

In Europe and America, a large number of fonts such as Times, Helvetica, and Courier are used. In addition, system fonts corresponding to various platforms have been used. Thus, the font processing system shown in FIG. 2B is effective to display fonts for other languages (non-Japanese languages). In particular, the combination of the character resources extracting program 46, the document media outputting program 40, the regular font type determining program 51, and the font reading program 56 is suitable for use in Europe and America as well as in Japan.

On the other hand, the combination of the character resources extracting program 46, the document media outputting program 40, the external character font type determining program 54, and the font reading program 56 is suitable for the use of external characters in Japan. The structure, in which such a combination and the regular font type determining program 51 exists, is suitable for the use of regular fonts and external character fonts in Japan.

Figure 3:
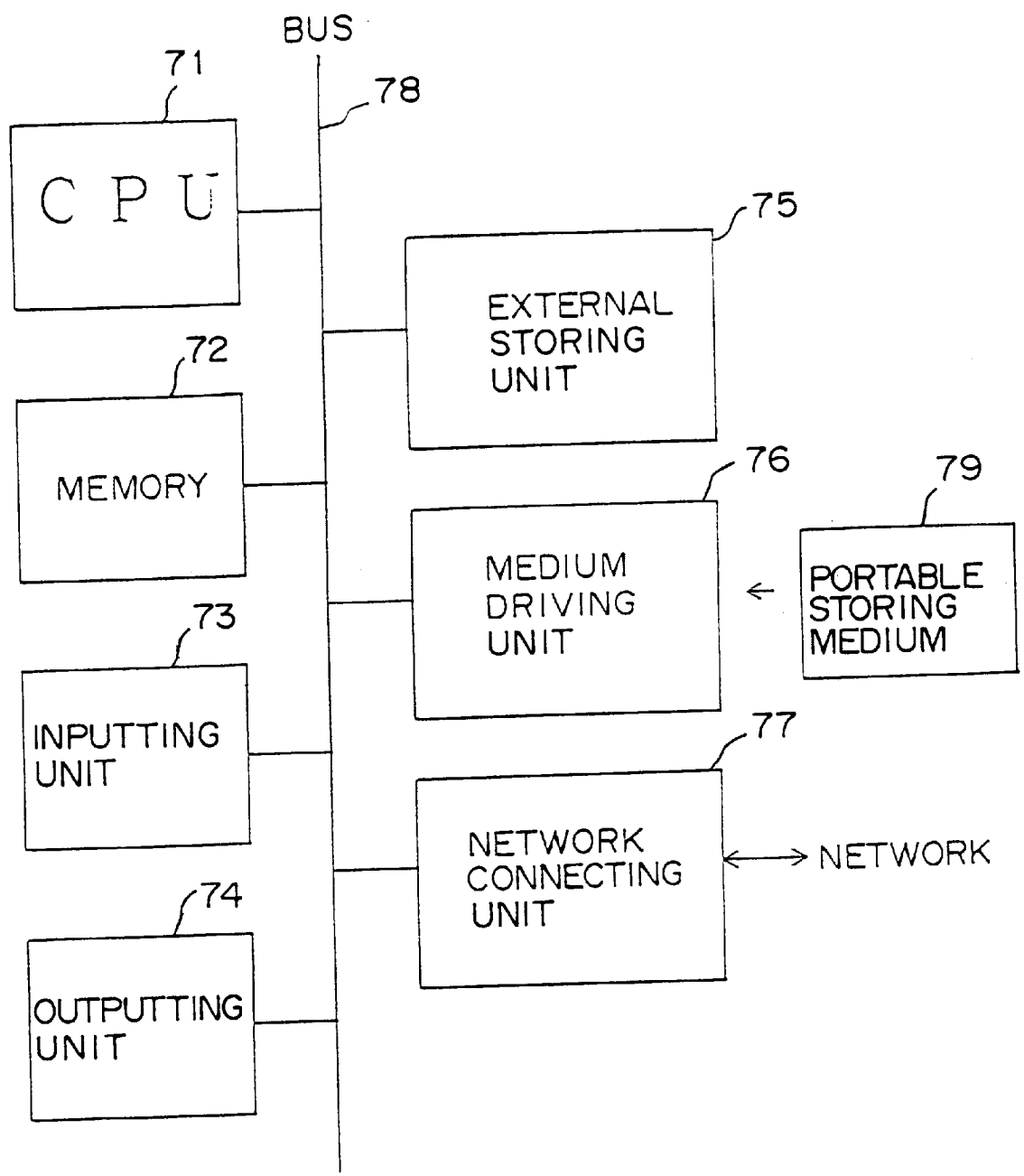
FIG. 3 is a schematic diagram showing the structure of an information processing apparatus.

FIG. 3 is a schematic diagram showing an example of the structure of an information processing apparatus corresponding to the WWW server 41 or the WWW client 61 shown in FIG. 2B. The information processing apparatus shown in FIG. 3 comprises a CPU (Central Processing Unit) 71, a memory 72, an inputting unit 73, an outputting unit 74, an external storing unit 75, a medium driving unit 76, and a network connecting unit 77. These units are mutually connected with a bus 78.

The CPU 71 executes a program stored in the memory 72 and accomplishes each process of the WWW server 41 or the WWW client 61. The memory 72 is, for example, a ROM (Read Only Memory) and RAM (Random Access Memory).

The inputting unit 73 is equivalent to, for example, a keyboard and a pointing device. The outputting unit 74 is equivalent to, for example, a display unit 67 or a printer.

The external storing unit 75 is equivalent to a magnetic disc unit, an optical disc unit, or a magneto-optical disc unit. The external storing unit 75 can store programs and data. In addition, the external storing unit 75 can be used as a database that stores font resources.

The medium driving unit 76 drives a portable storing medium 79 and accesses the stored contents thereon. The portable storing medium 79 is an arbitrary computer-readable storage medium such as a memory card, a floppy disc, a CD-ROM (Compact Disc Read Only Memory), an optical disc, or a magneto-optical disc, from which a computer can read programs and data. The portable storing medium 79 stores programs for performing processes of the WWW server 41 or the WWW client 61 along with data.

The network connecting unit 77 is connected to the WWW through a communication network such as a LAN (Local Area Network) and exchanges data necessary for communications. The WWW server 41 and the WWW client 61 can receive required data and programs from the network through the respective network connecting units 77.

It should be noted that the WWW server 41 and the WWW client 61 do not need to have all the structural elements shown in FIG. 3.

Next, with reference to FIGS. 4 to 6, the structure of a file used in the font processing system shown in FIG. 2B will be described.

FIG. 4 is a program list showing applets in an HTML document of the document media 43. In the HTML document shown in FIG. 4, line L1 includes the file name of an applet corresponding to the character resources extracting program 46. Line L2 contains the URL of the HTML document.

Line L3 contains the location of the applet (namely, the address of the server). Line L4 contains the file name of an applet corresponding to the document media processing program 47. Line L5 designates character media.

Line L6 contains the file name of an applet corresponding to the image media processing program 48. Line L7 designates image media and contains the file name of the image media 44.

Line L8 contains the file name of an applet corresponding to the sound media processing program 49. Line L9 designates the sound media and contains the file name of the sound media 45.

In this embodiment, since the file name of the document media outputting program 40 is stored in the character resources extracting program 46 beforehand, it is not necessary to contain the file name thereof in the HTML document.

The web browser 62 analyzes the HTML document, extracts individual media data and the files of the applets, and downloads them to the client side.

FIG. 5 is a schematic diagram showing an example of the format of the extracted font files 52 and 55. In the file shown in FIG. 5, character font data is categorized as fonts such as Mincho-tai font, Gothic font, and Mohitsu-tai font. Each font data has a structure as shown in FIG. 6.

Figure 6:
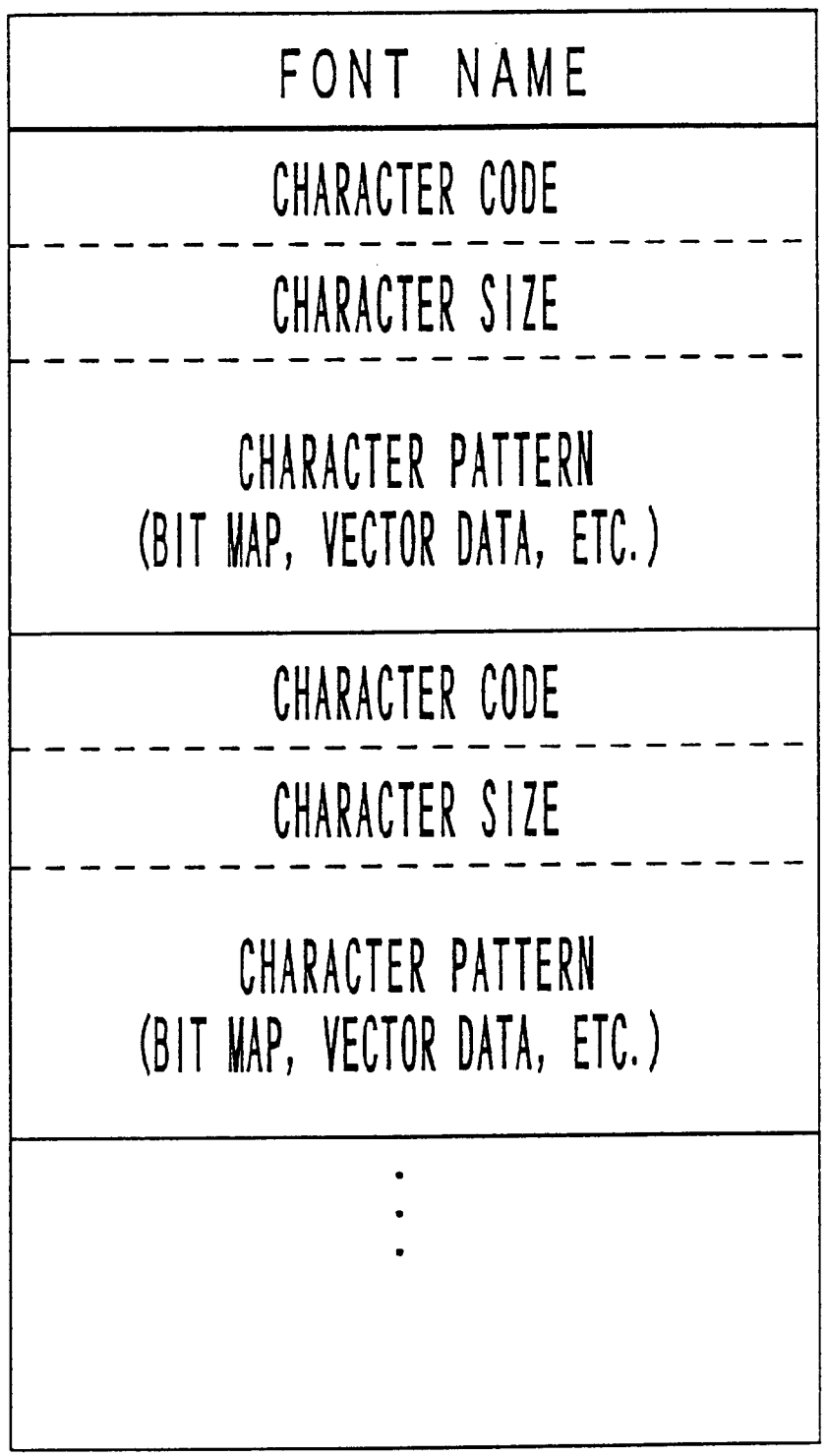
FIG. 6 is a schematic diagram showing font data for characters.

In FIG. 6, each font name is followed by font data. The font data is composed of character code, character size, and character pattern. The character code is identification information that identifies the character type. The character size represents the size of the characters. The character pattern is, for example, bit map data and vector data that represent the shape of characters that are output.

Next, with reference to FIGS. 7 to 15, processes performed in the font processing system shown in FIG. 2B, in the case that applets written in Java are used, will be described.

Figure 8:
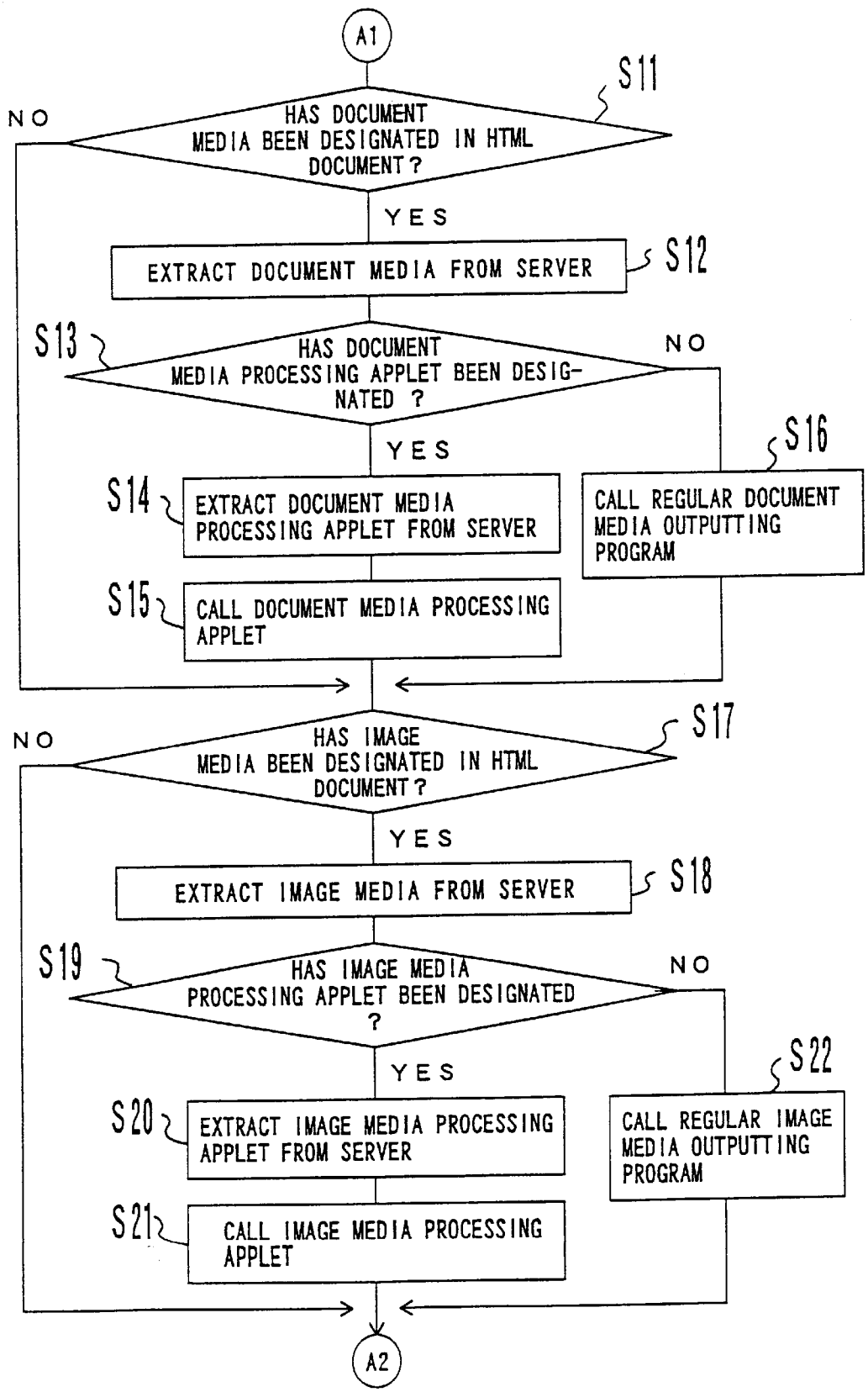
FIG. 8 is the second part of a flow chart showing the first browser process.
Figure 9:
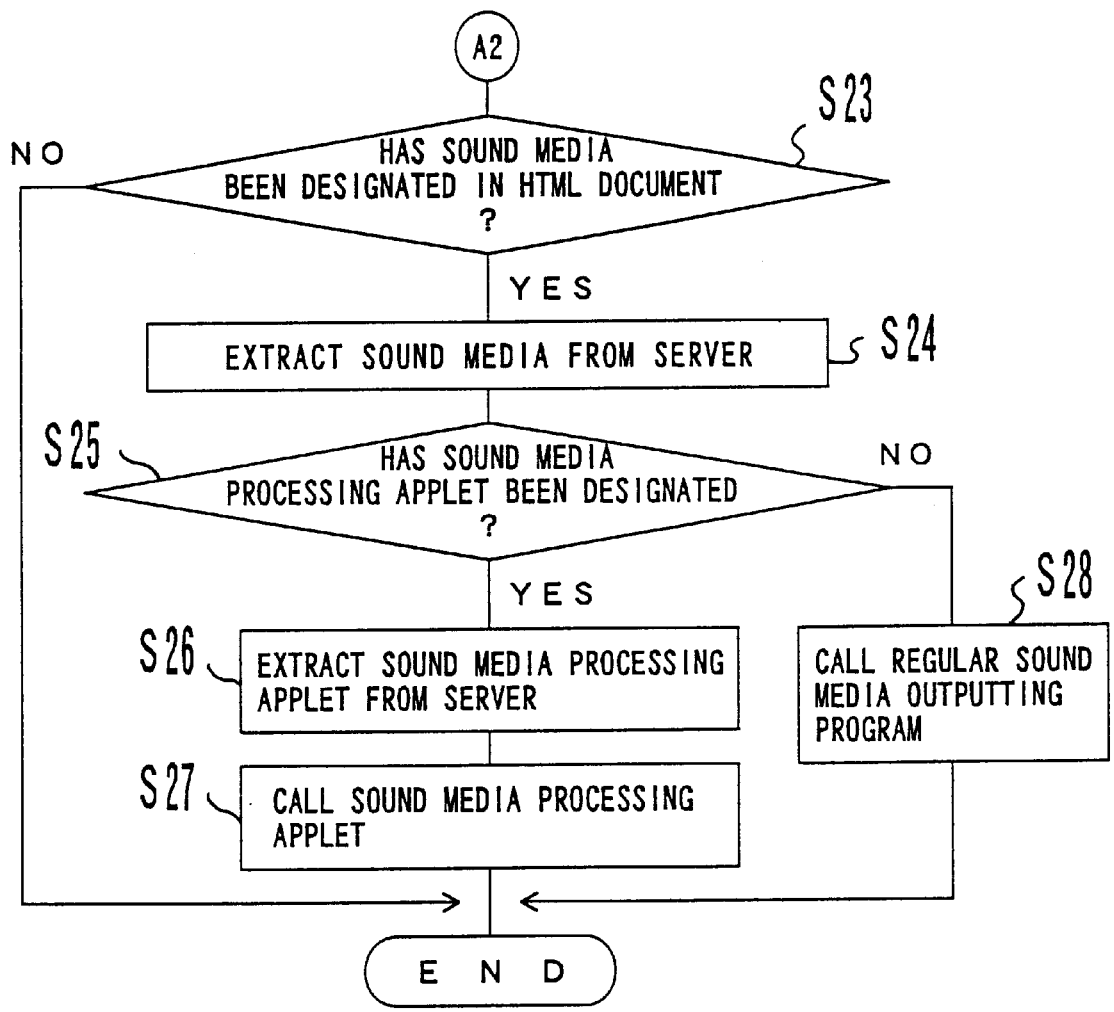
FIG. 9 is the third part of a flow chart showing the first browser process.

FIGS. 7, 8, and 9 are flow charts showing processes performed by the web browser 62. When the web browser 62 starts the process shown in FIG. 7, it reads and analyzes a URL that has been input (at step S1) and connects the WWW client 61 to the relevant server 41 corresponding to the URL (at step S2).

Next, the web browser 62 extracts a HTML document corresponding to the document media 43 from the server 41 with a file transfer protocol (FTP) (at step S3), analyzes it (at step S4), and sets the screen layout and background color for the HTML document (at step S5).

Next, the web browser 62 determines whether or not the character resources extracting applet 46 has been designated in the HTML document (at step S6). When the determined result is Yes, the web browser 62 extracts the character resources extracting applet 46 from the server 41 (at step S7) and executes it (at step S8).

Thereafter, the web browser 62 extracts the document media outputting applet 40 specified in the character resources extracting applet 46 from the server 41, executes it, and displays the text portion (home page) of the HTML document (at step S9). When the determined result at step S6 is No, the web browser 62 calls the regular document media outputting program 64 and displays the text portion of the HTML document (at step S10).

Next, the web browser 62 determines whether or not document media has been designated in the HTML document (at step S11 in FIG. 8). When the determined result is Yes, the web browser 62 extracts the document media from the server 41 (at step S12). Thereafter, the web browser 62 determines whether or not the document media processing applet 47 has been designated (at step S13). When the determined result at step S11 is No, the flow advances to step S17.

When the determined result at step S13 is Yes, the web browser 62 extracts the document media processing applet 47 from the server 41 (at step S14) and executes it (at step S15). When the determined result at step S13 is No, the web browser 62 executes the regular document media outputting program 64 (at step S16).

Next, the web browser 62 determines whether or not image media has been designated in the HTML document (at step S17). When the determined result is Yes, the web browser 62 extracts the image media 44 from the server 41 (at step S18). Next, the web browser 62 determines whether or not the image media processing applet 48 has been designated (at step S19). When the determined result at step S17 is No, the flow advances to step S23 shown in FIG. 9.

When the determined result at step S19 is Yes, the web browser 62 extracts the image media processing applet 48 from the server 41 (at step S20) and executes it (at step S21). When the determined result at step S19 is No, the web browser 62 executes the regular image media outputting program 65 (at step S22).

Thereafter, the web browser 62 determines whether or not sound media has been designated in the HTML document (at step S23 in FIG. 9). When the determined result at step S23 is Yes, the web browser 62 extracts the sound media 45 from the server 41 (at step S24). Thereafter, the web browser 62 determines whether or not the sound media processing applet 49 has been designated (at step S25). When the determined result at step S23 is No, the web browser 62 completes the process.

When the determined result at step S25 is Yes, the web browser 62 extracts the sound media processing applet 49 from the server 41 (at step S26) and executes it (at step S27). Thereafter, the web browser 62 completes the process. When the determined result at step S25 is No, the web browser 62 executes the regular sound media outputting program 66 (at step S28) and completes the process.

Figure 10:
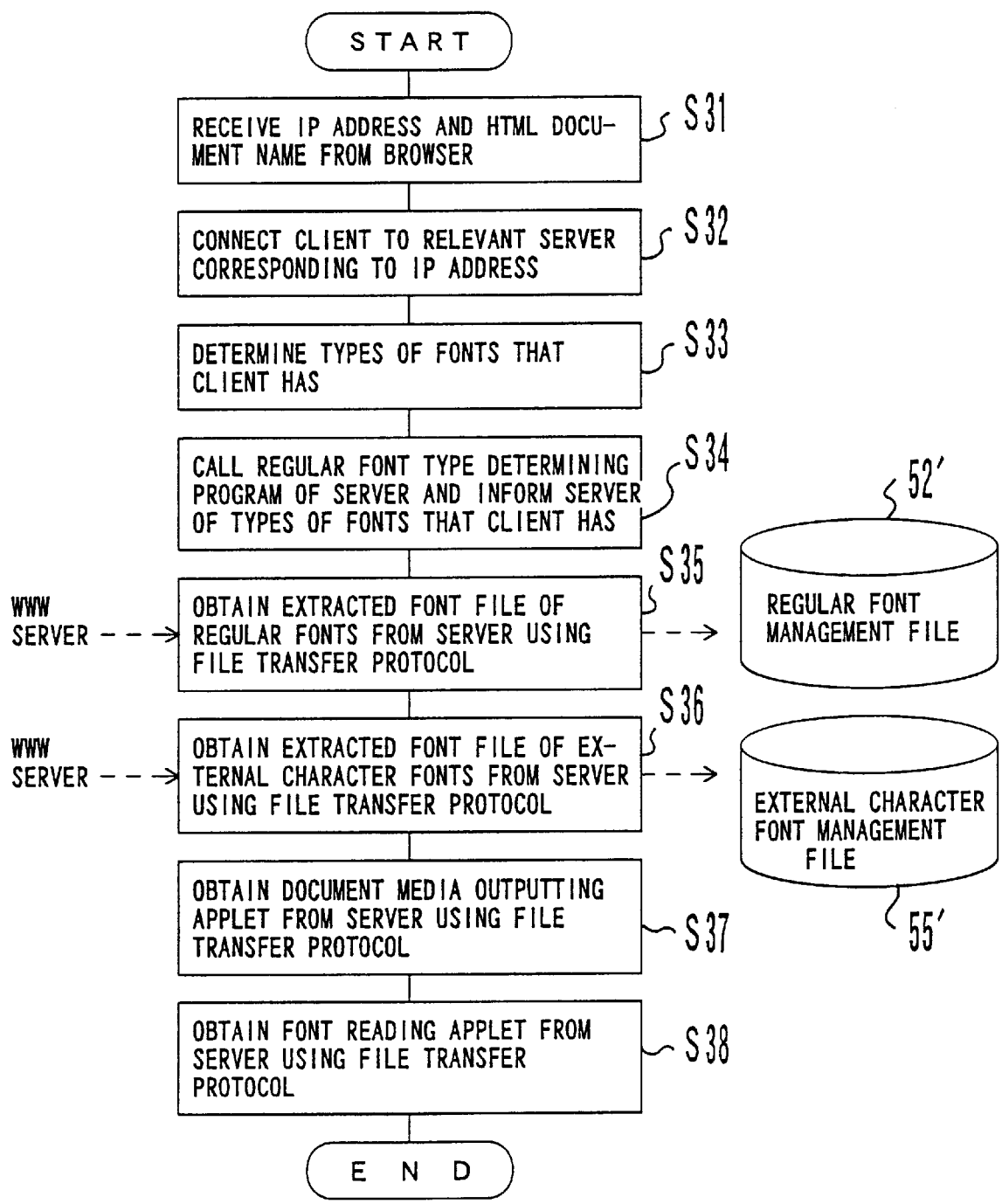
FIG. 10 is a flow chart showing the process of a character resource extracting program.

FIG. 10 is a flow chart showing the process of the character resources extracting applet 46 called at step S8 shown in FIG. 7. The character resources extracting applet 46 includes file names of the regular font type determining program 51, the document media outputting applet 40, and the font reading applet 56.

When the character resources extracting applet 46 starts the process shown in FIG. 10, it receives the IP address of the server 41 and the HTML document name of the document media 43 from the web browser 62 (at step S31) and connects the WWW client 61 to the server 41 (at step S32).

Thereafter, the character resources extracting applet 46 determines the types of fonts that the client 61 has (at step S33), calls the regular font type determining program 51 of the server 41, and informs the server 41 of the types of fonts that the client 61 has (at step S34).

Next, the character resources extracting applet 46 downloads the extracted font file 52 of regular fonts to be used using FTP from the server 41 and stores it as the regular font management file 52' in the client 61 (at step S35). Likewise, the character resource extracting applet 46 downloads the extracted font file 55 of external character fonts from the server 41 and stores it as the external character font management file 55' in the client 61 (at step S36).

Thereafter, the character resources extracting applet 46 downloads the document media outputting applet 40 from the server 41 using FTP (at step S37) and then the font reading applet 56 (at step S38). Thereafter, the character resources extracting applet 46 completes the process.

Thus, the character resources extracting applet 46 downloads the regular font management file 52', the external character font management file 55', the document media outputting applet 40, and the font reading applet 56 to the client 61. Thus, the client 61 can output the fonts that the information provider has designated.

Figure 11:
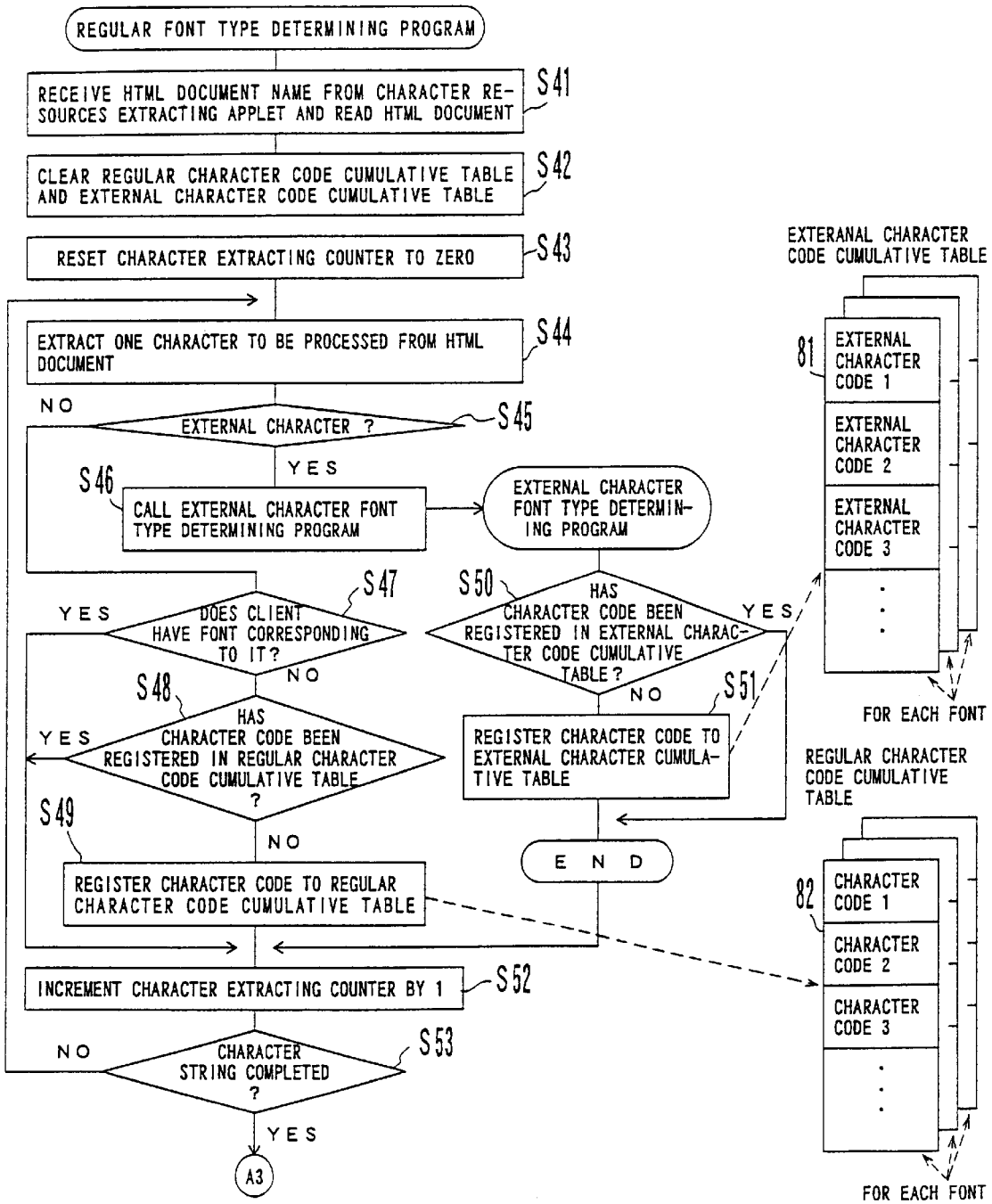
FIG. 11 is the first part of a flow chart showing the process of a regular font type determining program/external character font type determining program.
Figure 12:
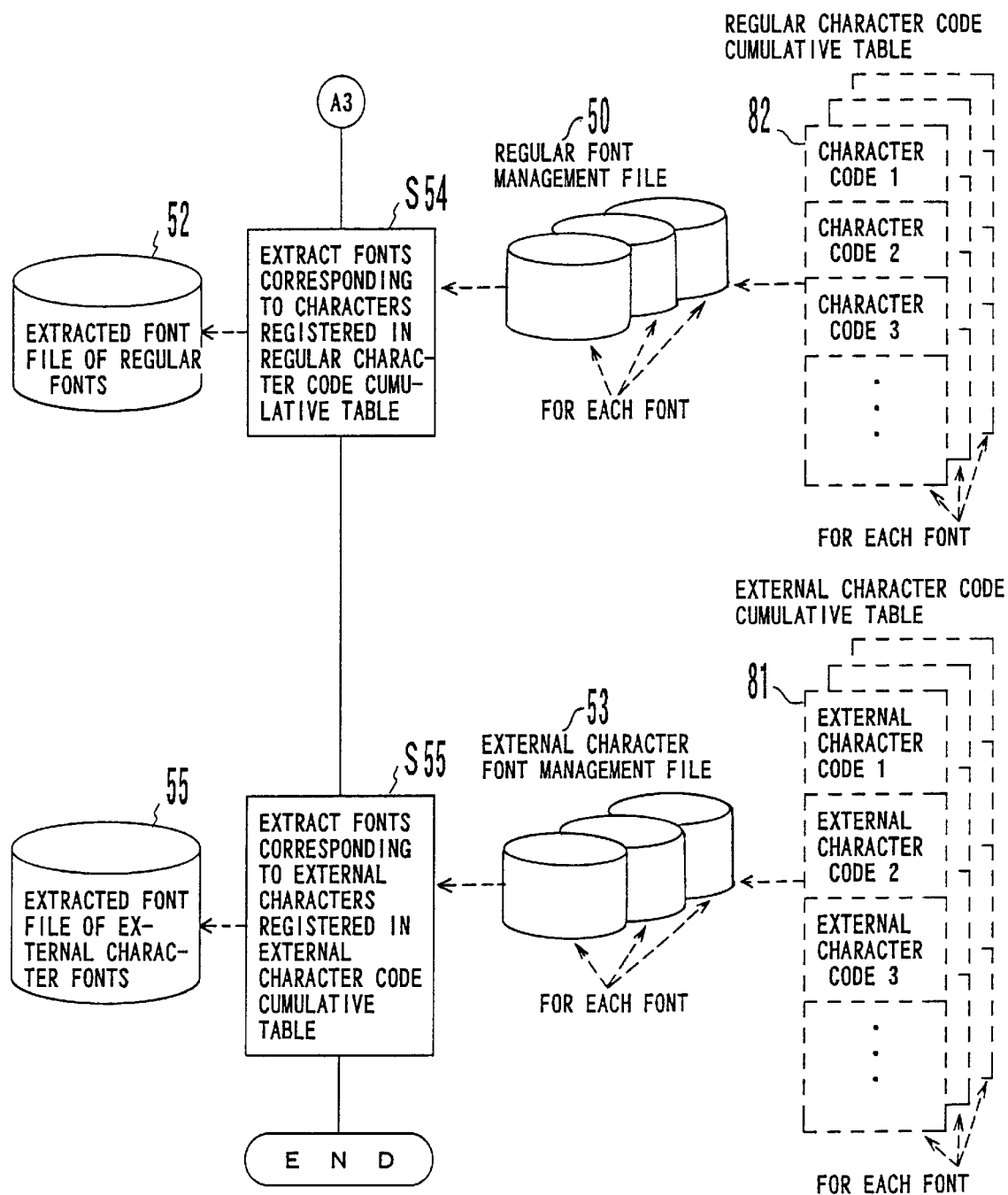
FIG. 12 is the second part of a flow chart showing the process of the regular font type determining program/ external character font type determining program.

FIGS. 11 and 12 are flow charts showing processes of the regular font type determining program 51 called at step S34 shown in FIG. 10 and the external character font type determining program 54 called thereby. When the regular font type determining program 51 starts the process shown in FIG. 11, it receives the HTML document name from the character resources extracting applet 46 that has called the regular font type determining program 51 and reads the relevant HTML document (the document media 43) corresponding thereto (at step S41).

Next, the regular font type determining program 51 clears the contents of an external character code cumulative table 81 and a regular character code cumulative table 82 stored in the work region of the memory of the server 41 (at step S42). In addition, the regular font type determining program 51 resets the character extracting counter to zero (at step S43).

The regular font type determining program 51 extracts one character to be processed from the HTML document (at step S44) and determines whether or not the character is an external character (at step S45). Normally, the external character codes have values out of the range of values of the regular character codes. Thus, when the regular font type determining program 51 reads a character code, it can determine whether or not it is an external character.

When the extracted character is an external character, the determined result is Yes at step S45, the regular font type determining program 51 calls the external character font type determining program 54 in the server 41 (at step S46). When it is not an external character, the regular font type determining program 51 determines whether or not the font of the character corresponds to any of the types of fonts in the client 61 informed of by the character resources extracting applet 46 (at step S47). When the determined result is Yes, the flow advances to step S52.

When the determined result at step S47 is No, the regular font type determining program 51 determines whether or not the extracted character has been registered in the regular character code cumulative table 82 (at step S48). When the determined result is Yes, the flow advances to step S52. When the determined result is No, the regular font type determining program 51 registers the character code as a new entry of a font in the regular character code cumulative table 82 (at step S49).

Thereafter, the regular font type determining program 51 increments the value of a character extracting counter by one (at step S52). Next, the flow advances to step S53. At step S53, the regular font type determining program 51 determines whether or not there is a character left to be processed. When the determined result is No, the flow returns to step S44. Thus, the regular character code cumulative table 82 cumulates different character codes for each font.

The external character font type determining program 54 determines whether or not a character to be processed has been registered in the external character code cumulative table 81 (at step S50).

When the determined result is Yes, the external character font type determining program 54 completes the process. When the determined result is No, the external character font type determining program 54 registers the external character code as a new entry of a font in the external character code cumulating table 81 (at step S51) and completes the process.

When the external character font type determining program 54 completes the process, the regular font type determining program 51 performs the process after step S52. Thus, different external character codes for each font are cumulated in the external character code cumulative table 81.

Next, the regular font type determining program 51 extracts fonts corresponding to characters registered in the regular character code cumulative table 82 from the regular font management file 50 in the server 41 and creates the extracted font file 52 of regular fonts (at step S54 shown in FIG. 12).

The regular font type determining program 51 extracts fonts corresponding to the external characters registered in the external character code cumulative table 81 from the external character management file 53 and generates the extracted font file 55 of external character fonts (at step S55) and completes the process.

Thus, only fonts necessary for displaying the document media 43 are selected from the font management files 50 and 53 and stored in the files 52 and 55, respectively. These files 52 and 55 are downloaded to the client 61 as the regular font management file 52' and the external character font management file 55'.

Figure 13:
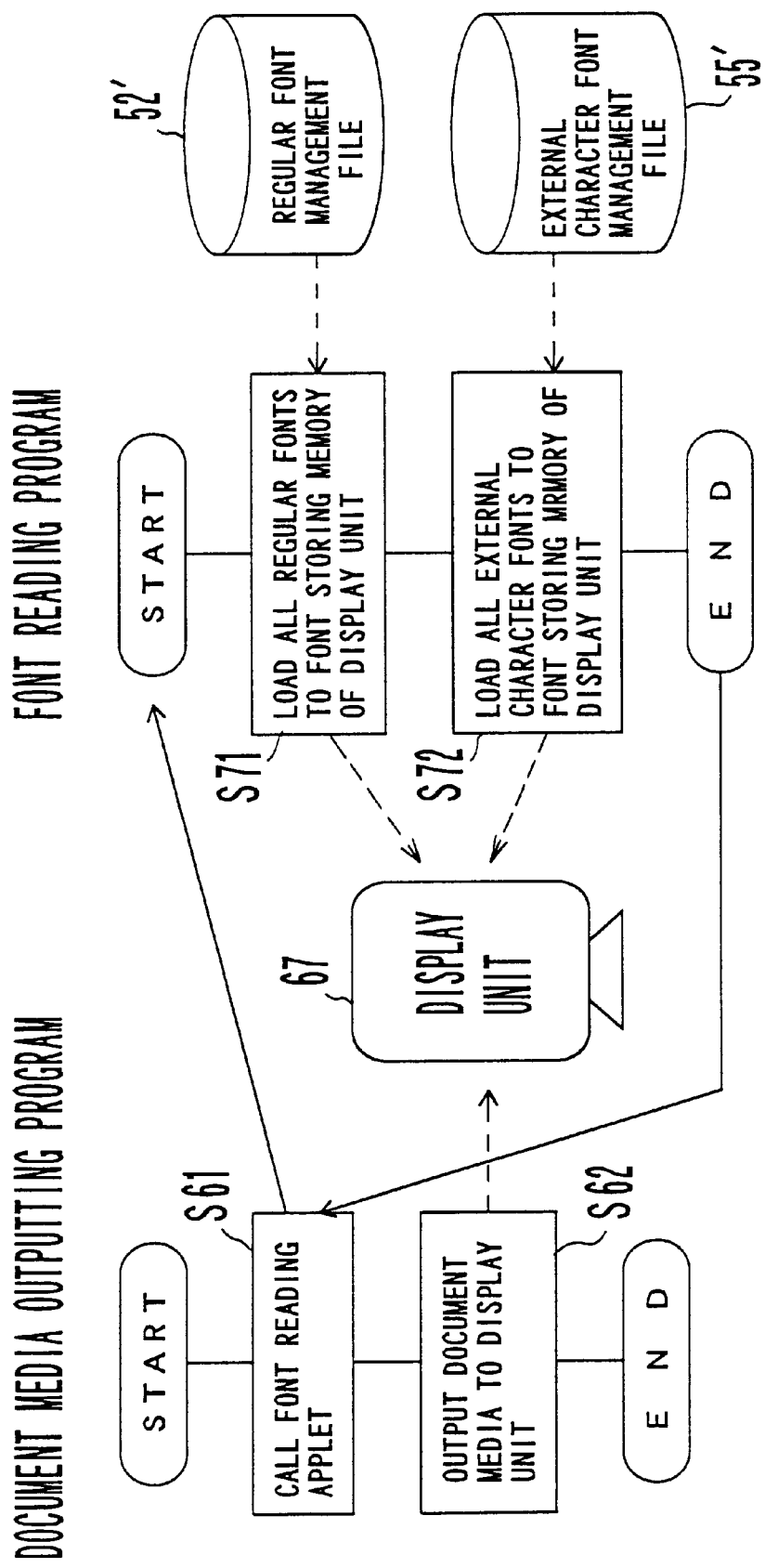
FIG. 13 shows flow charts showing the processes of a document media outputting program/font reading program.

FIG. 13 shows flow charts showing processes of the document media outputting applet 40 called at step S9 shown in FIG. 7 and the font reading applet 56 called thereby. When the document media outputting applet 40 starts the process shown in FIG. 13, it calls the font reading applet 56 in the client 61 (at step S61).

The font reading applet 56 loads all regular fonts in the regular font management file 52' to the font storing memory in the display unit 67 (at step S71). In addition, the font reading applet 56 loads all external character fonts in the external character font management file 55' to the font storing memory (at step S72). Thereafter, the font reading applet 56 completes the process.

Next, the document media outputting applet 40 displays the document media 43 on the display unit 67 with the fonts stored in the font storing memory (at step S62) and then completes the process.

As with the document media outputting applet 40, the document media processing applet 47 called at step S15 shown in FIG. 8 causes the font reading applet 56 to display the document media 43.

Figure 14:
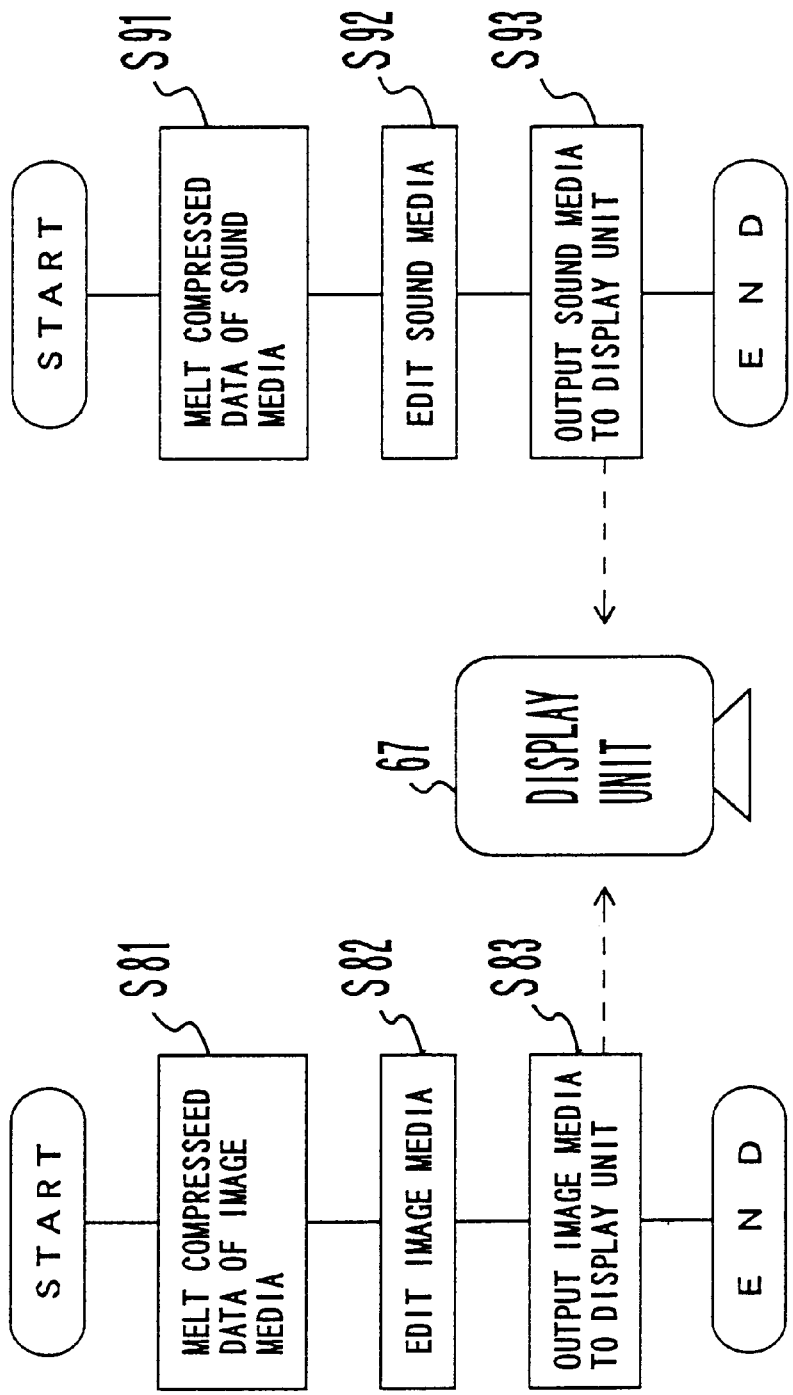
FIG. 14 shows flow charts showing the processes of an image media processing program/sound media processing program.

FIG. 14 is flow charts showing processes of the image media processing applet 48 called at step S21 shown in FIG. 8 and the sound media processing applet 49 called at step S27 shown in FIG. 9.

The image media processing applet 48 melts (expands) compressed data of the image media 44 (at step S81) and edits the resultant data corresponding to the method written in the applet 48 (at step S82). Thereafter, the image media processing applet 48 causes the display unit 67 to display the edited data (at step S83) and completes the process.

The sound media processing applet 49 melts compressed data of the sound media 45 (at step S91) and edits the resultant data corresponding to the method written in the applet 49 (at step S92). Thereafter, the sound media processing applet 49 outputs the edited data to a speaker of the display unit 67 (at step S93) and then completes the process.

Figure 15:
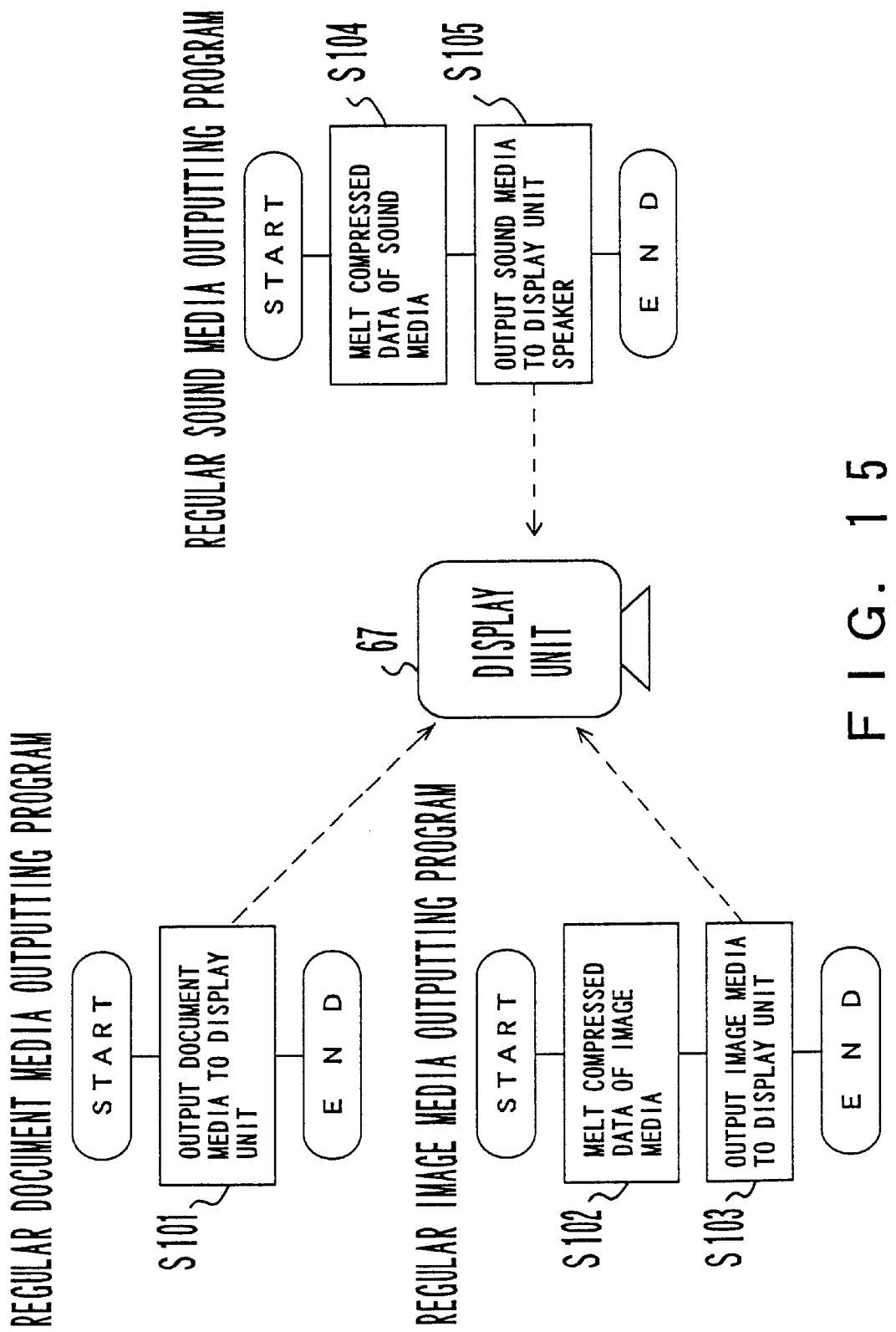
FIG. 15 shows flow charts showing the processes of the media outputting programs.

FIG. 15 is a flow chart showing processes of the regular document media outputting program 64 called at steps S10 shown in FIG. 7 and S16 shown in FIG. 8, the regular image media outputting program 65 called at step S22 shown in FIG. 8, and the regular sound media outputting program 66 called at step S28 shown in FIG. 9.

The document media outputting program 64 causes the regular font reading program 63 to display the document media 43 on the display unit 67 (at step S101) and then completes the process.

The image media outputting program 65 melts compressed data of the image media 44 (at step S102), displays the resultant data on the display unit 67 (at step S103), and completes the process.

The sound media outputting program 66 melts compressed data of the sound media 45 (at step S104), outputs the resultant data to the speaker of the display unit 67 (at step S105), and then completes the process.

In the above-described embodiment, the character resources extracting program 46, the document media outputting program 40, and the font reading program 56 are downloaded from the server 41. However, these programs can be disposed in the client 61.

FIGS. 16, 17, 18, and 19 are flow charts showing processes of the web browser 62 and the font reading program 56 in the case that the web browser 62 has functions of the character resource extracting program 46 and the document media outputting program 40 and that the client 61 has the font reading program 56.

Figure 16:
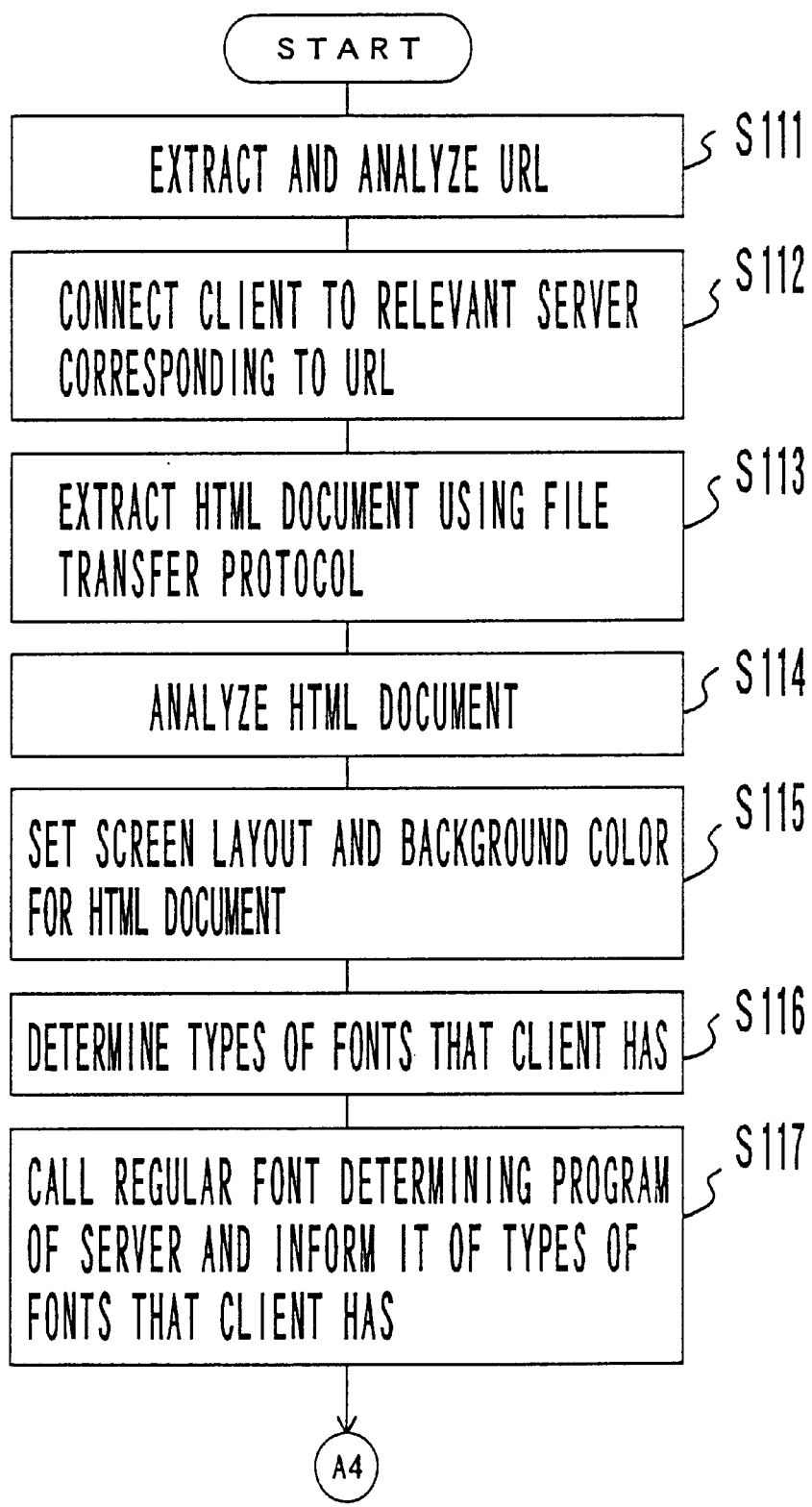
FIG. 16 is the first part of a flow chart showing a second browser process.

When the web browser 62 starts the process shown in FIG. 16, it extracts and analyzes an URL being input (at step S114) and connects the client to the relevant server 41 (at step S112).

Thereafter, the web browser 62 extracts an HTML document corresponding to the document media 43 from the server 41 with the FTP (at step S113), analyzes it (at step S114), and sets the screen layout and background color for the HTML document (at step S115).

Thereafter, the web browser 62 determines the types of fonts that the client 61 has (at step S116), calls the regular font type determining program 51 of the server 41, and informs it of the types of fonts that the client 61 has (at step S117).

Figure 17:
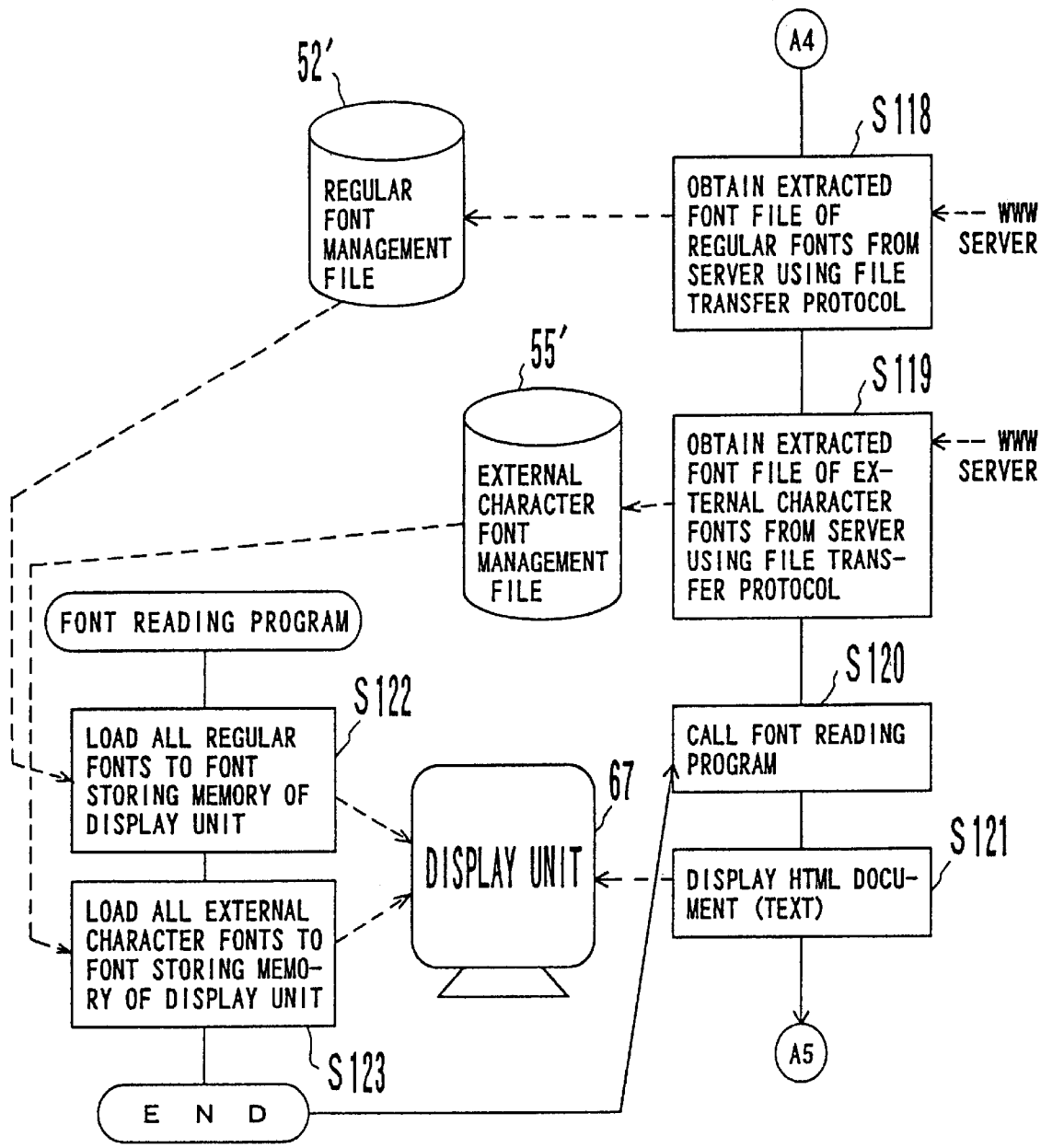
FIG. 17 is the second part of a flow chart showing the second browser process.

Next, the web browser 62 downloads the file 52 from the server 41 using the FTP and stores it as the regular font management file 52' in the client 61 (at step S118 shown in FIG. 17). Likewise, the web browser 62 downloads the file 55 from the server 41, stores it as the external character font management file 55' in the client 61 (at step S119). Thereafter, the web browser 62 calls the font reading program 56 (at step S120).

The font reading program 56 loads all the fonts in the regular font management file 52' to the font storing memory of the display unit 67 (at step S122). In addition, the font reading program 56 loads all the external character fonts in the external character management file 55' to the font storing memory (at step S123). Thereafter, the font reading program 56 completes the process.

Next, the web browser 62 displays the text of the HTML document on the display unit 67 using the fonts stored in the font storing memory (at step S121).

Figure 18:
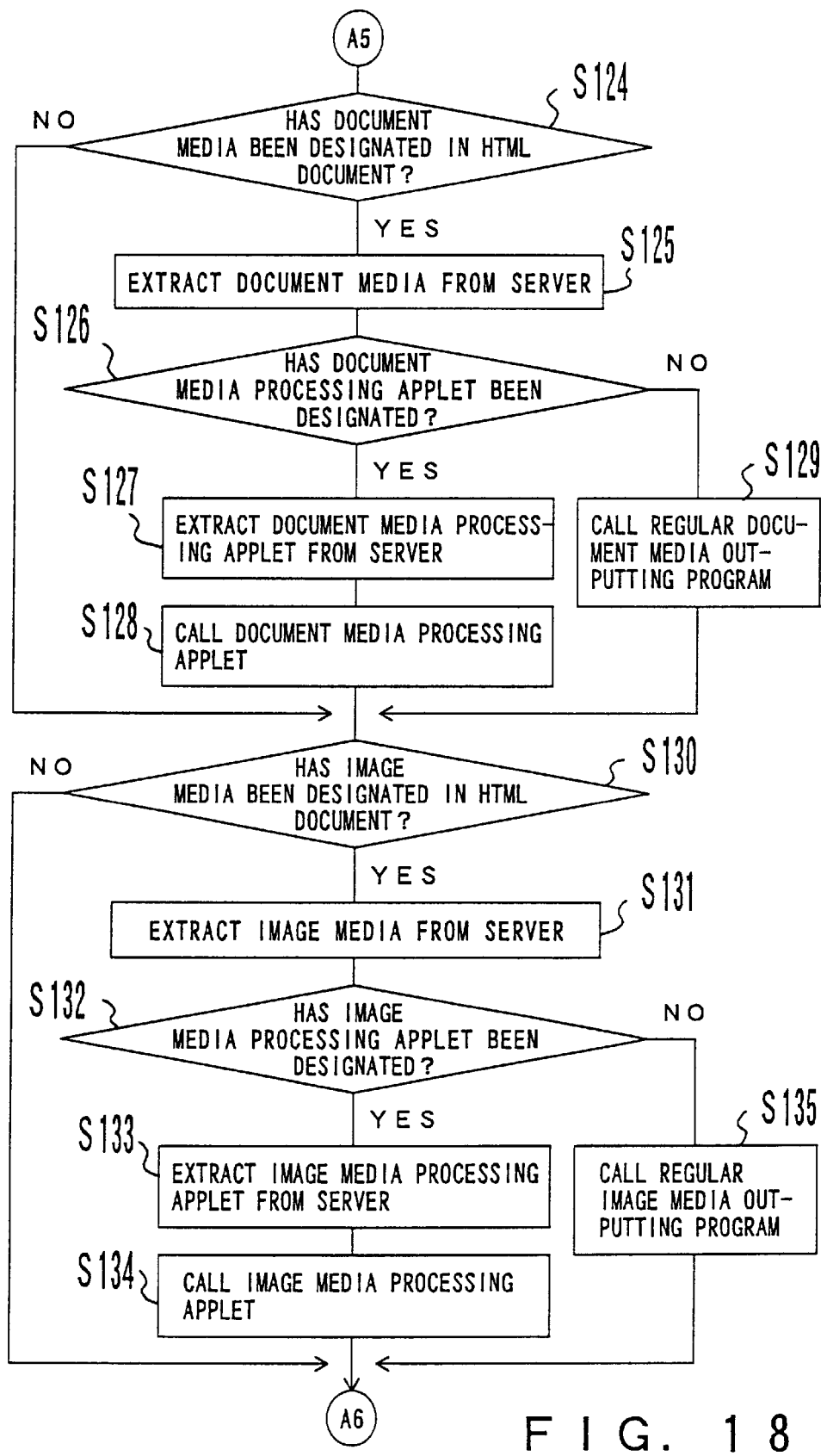
FIG. 18 is the third part of a flow chart showing the second browser process.

Next, the web browser 62 determines whether or not document media has been designated in the HTML document (at step S124 shown in FIG. 18). When the determined result is Yes, the web browser 62 extracts the document media from the server 41 (at step S125). Thereafter, the web browser 62 determines whether or not the document media processing applet 47 has been designated (at step S126). When the determined result at step S124 is No, the flow advances to step S130.

Next, when the determined result at step S126 is Yes, the web browser 62 extracts the document media processing applet 47 from the server 41 (at step S127) and executes it (at step S128). When the determined result at step S126 is No, the web browser 62 executes the regular document media outputting program 64 (at step S129). Thereafter the flow advances to step S130.

Next, the web browser 62 determines whether or not image media has been designated in the HTML document (at step S130). When the determined result at step S130 is Yes, the web browser 62 extracts the image media 44 from the server 41 (at step S131). Thereafter, the web browser 62 determines whether or not the image media processing applet 48 has been designated (at step S132). When the determined result at step S130 is No, the flow advances to step S136, shown in FIG. 19.

When the determined result at step S132 is Yes, the web browser 62 extracts the image media processing applet 48 from the server 41 (at step S133) and executes it (at step S134). When the determined result at step S132 is No, the web browser 62 executes the regular image media outputting program 65 (at step S135).

Figure 19:
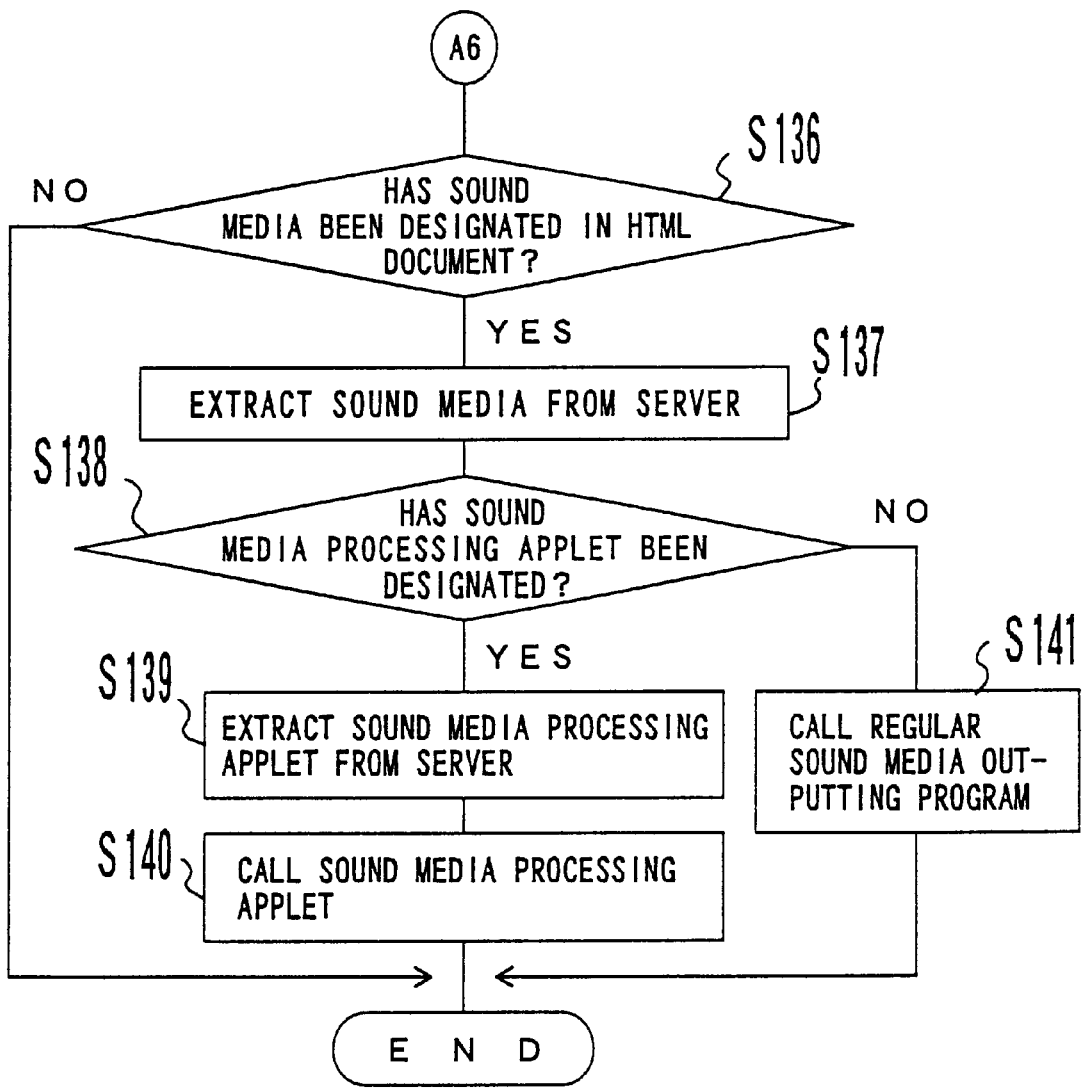
FIG. 19 is the fourth part of a flow chart showing the second browser process.

Next, the web browser 62 determines whether or not sound media has been designated in the HTML document (at step S136 in FIG. 19). When the determined result at step S136 is Yes, the web browser 62 extracts the sound media 45 from the server 41 (at step S137). Thereafter, the web browser 62 determines whether or not the sound media processing applet 49 has been designated (at step S138). When the determined result at step S136 is No, the web browser 62 completes the process.

When the determined result at step S138 is Yes, the web browser 62 extracts the sound media processing applet 49 from the server 41 (at step S139) and executes it (at step S140). Thereafter, the web browser 62 completes the process. When the determined result at step S138 is No, the web browser 62 executes the regular sound media outputting program 66 (at step S141) and completes the process.

In the font processing system shown in FIG. 2B, the extracted font files 52 and 55 are separately created and downloaded to the client 61. However, the files 52 and 55 can be combined as one extracted font file and then downloaded to the client 61. In this case, character codes of regular characters and external characters are stored in the same file. However, according to the range of character code values and so forth, the regular characters and external characters can be distinguished.

According to the present invention, in a network environment such as the Internet, the server side can control information, programs, and so forth that it provides, so as to improve expressions in character media.

In particular, once the server side prepares fonts, each end user terminal can display them. Thus, each end user terminal needs only a minimum number of software tools. Consequently, the cost of the end user terminal can be reduced.

In addition to JIS class 1 characters and JIS class 2 characters, each end user terminal can display other external characters that service providers define and add.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A font processing apparatus for a server unit that is an information processing unit on a communication network and provides information, comprising:

storing means for storing font resources and character media data, the font resources being required to output the character media data, the font resources being dynamically created correspondingly to the character media data in at least two styles of type; and outputting means for sending the character media data and the required font resources to the network.

2. The font processing apparatus as set forth in claim 1, further comprising:

character type extracting means for extracting the required font resources from font resources of a plurality of styles of type that have been prepared in advance, wherein said storing means stores document data including the character media data, and wherein said character type extracting means analyzes the document data, extracts font data corresponding to each character of the character media data from the font resources of the plurality of styles, and creates the required font resources including the extracted font data.

3. The font processing apparatus as set forth in claim 2, wherein said character type extracting means excludes font data stored in a client unit, that is an information processing unit and has received the character media data, from the required font resources.

4. The font processing apparatus as set forth in claim 1, wherein said storing means also stores a character resources extracting program for causing a client unit, that is an information processing unit and has received the character media data, to download the required font resources from the server unit, wherein said outputting means sends the character resources extracting program to the network along with the character media data, and wherein the client unit outputs the character media data using the character resources extracting program.

5. The font processing apparatus as set forth in claim 4, wherein said storing means also stores a font reading program for extracting font data for each character from the required font resources, wherein the character resources extracting program downloads the font reading program from the server unit through the network, and wherein the client unit outputs the character media data using the font reading program.

6. The font processing apparatus as set forth in claim 5, wherein said storing means also stores a document media outputting program for outputting the character media data using the font data extracted by the font reading program, and wherein said client unit downloads the document media outputting program from the server unit through the network and outputs the character media data.

7. The font processing apparatus as set forth in claim 6, wherein said storing means stores at least one of the character resources extracting program, the font reading program, and the document media outputting program in the f ormat of a program written in an interpreter, network-based language.

8. The font processing apparatus as set forth in claim 1, wherein said storing means stores the character media data including at least one external character arbitrarily defined.

9. The font processing apparatus as set forth in claim 8, further comprising:
   external character extracting means for extracting font data for the external character from font resources of a plurality of styles of external character that has been prepared in advance,
   wherein said storing means stores document data including the character media data, and
   wherein said external character extracting means analyzes the document data, extracts font data corresponding to the external character from the font resources of the plurality of styles, and creates the required font resources including the extracted font data.

10. A font processing apparatus for a client unit that is an information processing unit on a communication network and receives information, comprising:
    inputting means for receiving font resources and character media data from the network, the font resources being required to output the character media data in at least two styles of type, the font resources being dynamically created correspondingly to the character media data; and
    outputting means for outputting the character media data using the required font resources.

11. The font processing apparatus as set forth in claim 10, wherein said inputting means receives from the network the required font resources excluding font data that the client unit already has.

12. The font processing apparatus as set forth in claim 10, further comprising:
    character resources extracting means for downloading the required font resources from a server unit, that is an information processing unit and has sent the character media data, through the network.

13. The font processing apparatus as set forth in claim 12, further comprising:
    font reading means for extracting font data for each character from the required font resources,
    wherein said outputting means outputs the character media data in cooperation with said font reading means.

14. The font processing apparatus as set forth in claim 10, wherein said inputting means receives from the network the character media data including at least one external character arbitrarily defined.

15. A font processing system for use in a network environment in which a server unit that provides information and a client unit that receives the information are connected with a communication network, comprising:
    storing means for storing font resources and character media data, the font resources being required to output the character media data, the font resources being dynamically created correspondingly to the character media data;
    first outputting means for sending the character media data and the required font data to the network;
    inputting means for receiving the character media data and the required font resources from the network; and
    second outputting means for outputting the character media data using the required font resources.

16. A resources supplying apparatus for a server unit that is an information processing unit on a communication network and provides information, comprising:
    storing means for storing information resources and media data, the information resources being required to output the media data in at least two styles, the required information resources being dynamically created correspondingly to the media data; and
    outputting means for sending the media data and the required information resources to the network.

17. A computer-readable storage medium, when used by a computer on a communication network for providing information, used to direct the computer to perform the functions of:
    dynamically creating font resources required to output character media data in at least two styles of type correspondingly to the character media data; and
    sending the character media data and the required font resources to the network.

18. A computer-readable storage medium, when used by a computer on a communication network for receiving information, used to direct the computer to perform the functions of:
    receiving font resources and character media data from the network, the font resources being required to output the character media data in at least two styles of type, the required font resources being dynamically created correspondingly to the character media data, and
    outputting the character media data using the required font resources.

19. A font processing method in a network environment in which a server unit that provides information and a client unit that receives the information are connected with a communication network, comprising the steps of:
    dynamically creating font resources required to output character media data in at least two styles of type correspondingly to the character media data in the server unit; and
    sending the character media data and the required font resources from the server unit to the client unit through the network.

20. The font processing method as set forth in claim 19, wherein the character media data is output using the required font resources from the client unit.

21. A resources providing method in a network environment in which a server unit that provides information and a client unit that receives the information are connected with a communication network, comprising the steps of:
    dynamically creating information resources required to output media data in at least two styles correspondingly to the media data in the server unit; and
    sending the media data and the required information resources from the server unit to the client unit through the network.

22. A method of transferring requested text data from a server system to client systems, comprising:
    automatically downloading a character resources extracting program from the server to a requesting client system, along with the requested text data;
    executing the character resources extracting program to determine at least one font file unavailable on the requesting client system and required to output the requested text data; and
    downloading the at least one font file from the server system to the requesting client system in response to a request automatically issued by the character resources extracting program.

* * * * *

UNITED STATES PATENT AND TRADEMARK OFFICE
CERTIFICATE OF CORRECTION

PATENT NO. : 6,320,587 B1
DATED : November 20, 2001
INVENTOR(S) : Takashi Funyu et al.

It is certified that error appears in the above-identified patent and that said Letters Patent is hereby corrected as shown below:

<u>Column 16, lines 2-67 through Column 18, lines 1-65,</u>
Please replace the claims as follows:

1. A font processing apparatus for a server unit that is an information processing unit on a communication network and that provides information via the communication network to a client unit that is an information processing unit, said font processing apparatus comprising:
    a storing unit to store a character resources extracting program, character media data, and font resources required to output the character media data, the font resources being dynamically created correspondingly to the character media data; and
    an outputting unit to send the character media data with the character resources extracting program and, subsequently, required font resources, to the client information processing unit via the network, the character resources extracting program causing the client information processing unit, upon receipt of the character media data, to download the required font resources from the server information processing unit, and enabling output of the character media data.

2. The font processing apparatus as set forth in claim 1,
    further comprising a character type extracting unit to extract the required font resources from the font resources of a plurality of styles of type that have been prepared in advance,
    wherein said storing unit stores document data including the character media data, and
    wherein said character type extracting unit analyzes the document data, extracts font data corresponding to each character of the character media data from the font resources of the plurality of styles, and creates the required font resources including the font data.

3. The font processing apparatus as set forth in claim 2, wherein said character type extracting unit excludes previously stored font data in the client unit from the required font resources.

4. The font processing apparatus as set forth in claim 1,
    wherein said storing unit also stores a font reading program for extracting font data for each character from the required font resources,
    wherein the character resources extracting program downloads the font reading program from the server unit via the network, and
    wherein the client unit outputs the character media data using the font reading program.

5. The font processing apparatus as set forth in claim 4,
    wherein said storing unit also stores a document media outputting program for outputting the character media data using the font data extracted by the font reading program, and
    wherein said client unit downloads the document media outputting program from the server unit through the network and outputs the character media data.

6. The font processing apparatus as set forth in claim 5, wherein said storing unit stores at least one of the character resources extracting program, the font reading program, and the document media outputting program in the format of a program written in an interpreter, network-based language.

7. The font processing apparatus as set forth in claim 1, wherein said storing unit stores the character media data including at least one external character arbitrarily defined.

UNITED STATES PATENT AND TRADEMARK OFFICE
CERTIFICATE OF CORRECTION

PATENT NO.    : 6,320,587 B1
DATED         : November 20, 2001
INVENTOR(S)   : Takashi Funyu et al.

It is certified that error appears in the above-identified patent and that said Letters Patent is hereby corrected as shown below:

8. The font processing apparatus as set forth in claim 7,
further comprising an external character extracting unit to extract font data for the external character from font resources of a plurality of styles of the external character that have been prepared in advance,
wherein said storing unit stores document data including the character media data, and
wherein said external character extracting unit analyzes the document data, extracts font data corresponding to the external character from the font resources of the plurality of styles, and creates the required font resources including the font data.

9. A font processing apparatus for a client unit that is an information processing unit on a communication network and receives information from server unit, that is an information processing unit, said font processing apparatus comprising:
an inputting unit to receive font resources and character media data from the network, the font resources being required to output the character media data, the font resources being dynamically created correspondingly to the character media data;
a character resources extracting unit to download the font resources from the server unit that has sent the character media data via the network; and
an outputting unit to output the character media data using the font resources.

10. The font processing apparatus as set forth in claim 9,
wherein said inputting unit receives from the network the font resources excluding font data that the client unit already has.

11. The font processing apparatus as set forth in claim 9,
further comprising a font reading unit to extract font data for each character from the font resources, and
wherein said outputting unit outputs the character media data in cooperation with said font reading unit.

12. The font processing apparatus as set forth in claim 9,
wherein said inputting unit receives from the network the character media data including at least one external character arbitrarily defined.

13. A font processing system for use in a network environment in which a server unit that provides information and a client unit that receives the information are connected by a communication network, comprising:
a storing unit to store font resources and character media data and a character resources extracting program to cause the client unit to download the font resources from the server unit, the font resources being required to output the character media data and being dynamically created correspondingly to the character media data;
a first outputting unit to send the character media data with the character resources extracting program, and the font data to the network;
an inputting unit to receive the character media data and the font resources from the network; and
a second outputting unit to output the character media data using the character resources extracting program and the font resources.

UNITED STATES PATENT AND TRADEMARK OFFICE
CERTIFICATE OF CORRECTION

PATENT NO. : 6,320,587 B1
DATED : November 20, 2001
INVENTOR(S) : Takashi Funyu et al.

It is certified that error appears in the above-identified patent and that said Letters Patent is hereby corrected as shown below:

14. A resources supplying apparatus for a server unit that is an information processing unit on a communication network and provides information to a client unit that is an information processing unit, comprising:
  a storing unit to store information resources, media data and a resources extracting program to cause the client unit that has received the media data to download the information resources from the server unit and output the media data, the information resources being required to output the media data and being dynamically created correspondingly to the media data; and
  an outputting unit to send the media data with the resources extracting program, and the required information resources to the network.

15. A computer readable storage medium storing a program to control a computer, on a communication network for providing information, to perform a method comprising:
  dynamically creating font resources, required to output character media data, correspondingly to the character media data; and
  sending to the network the character media data with a character resources extracting program to cause a client unit, that is an information processing unit and has received the character media data, to download the font resources from the computer, and to enable the client unit to output the character media data using the character resources extracting program, and the font resources when downloaded by the client unit.

16. A computer readable storage medium storing a program to control a computer, on a communication network for receiving information, to perform a method comprising:
  receiving, via the network from a server unit that is an information processing unit, character media data with a character resources extracting program to cause the computer to download font resources required to output the character media data and dynamically created correspondingly to the character media data;
  receiving the font resources from the network using the character resources extracting program; and
  outputting the character media data using the font resources.

17. A method of transferring requested text data from a server system to client systems, comprising:
  automatically downloading a character resources extracting program from the server to a requesting client system, along with the requested text data;
  executing the character resources extracting program to determine at least one font file unavailable on the requesting client system and required to output the requested text data; and
  downloading the at least one font file from the server system to the requesting client system in response to a request automatically issued by the character resources extracting program.

UNITED STATES PATENT AND TRADEMARK OFFICE
CERTIFICATE OF CORRECTION

PATENT NO.    : 6,320,587 B1
DATED         : November 20, 2001
INVENTOR(S)   : Takashi Funyu et al.

It is certified that error appears in the above-identified patent and that said Letters Patent is hereby corrected as shown below:

18. A method of transferring requested media data from a server system to client systems, comprising:
    automatically downloading a resource extracting program from the server to a requesting client system, along with the requested media data;
    executing the resources extracting program to determine at least one resource file unavailable on the requesting client system and required to output the requested media data; and
    downloading the at least one resource file from the server system to the requesting client system in response to a request automatically issued by the resource extracting program.

Signed and Sealed this

Sixth Day of May, 2003

JAMES E. ROGAN
*Director of the United States Patent and Trademark Office*